US012253382B2

(12) United States Patent
Olsson et al.

(10) Patent No.: US 12,253,382 B2
(45) Date of Patent: Mar. 18, 2025

(54) VEHICLE-BASED UTILITY LOCATING USING PRINCIPAL COMPONENTS

(71) Applicant: SeeScan, Inc., San Diego, CA (US)

(72) Inventors: Mark S. Olsson, La Jolla, CA (US); Paul Wisecaver, San Diego, CA (US); Samantha Crane-Solis, San Marcos, CA (US)

(73) Assignee: SeeScan, Inc., San Diego, CA (US)

( * ) Notice: Subject to any disclaimer, the term of this patent is extended or adjusted under 35 U.S.C. 154(b) by 834 days.

(21) Appl. No.: 17/382,040

(22) Filed: Jul. 21, 2021

(65) Prior Publication Data

US 2022/0026238 A1 Jan. 27, 2022

Related U.S. Application Data

(60) Provisional application No. 63/055,278, filed on Jul. 22, 2020.

(51) Int. Cl.
*G01C 21/00* (2006.01)
*G01V 3/08* (2006.01)

(52) U.S. Cl.
CPC ..... *G01C 21/3848* (2020.08); *G01C 21/3807* (2020.08); *G01V 3/081* (2013.01)

(58) Field of Classification Search
CPC . G01C 21/3848; G01C 21/3807; G01V 3/081
See application file for complete search history.

(56) References Cited

U.S. PATENT DOCUMENTS

| 9,945,976 | B2* | 4/2018 | Olsson | G01V 3/08 |
|---|---|---|---|---|
| 11,196,181 | B2* | 12/2021 | Bench | H01Q 1/243 |
| 11,953,643 | B1* | 4/2024 | Olsson | G09B 29/007 |
| 2006/0178849 | A1 | 8/2006 | Maier et al. | |
| 2017/0363764 | A1 | 12/2017 | Aldridge et al. | |

OTHER PUBLICATIONS

International Searching Authority, "Written Opinion of the International Searching Authority" for PCT Patent Application No. PCT/US2021/042611, Jan. 28, 2022, European Patent Office, Munich.

* cited by examiner

*Primary Examiner* — Elias Desta
(74) *Attorney, Agent, or Firm* — Steven C. Tietsworth, Esq.; Michael J. Pennington, Esq.

(57) ABSTRACT

The present disclosure is directed to vehicle-based systems for locating and mapping buried utility lines using principal components. Vehicle-based utility locating devices receive magnetic field signals emitted by utility lines and, with determined position data, implement principal component analysis to locate and map the utility lines.

20 Claims, 15 Drawing Sheets

VEHICLE-BASED UTILITY LOCATING USING PRINCIPAL COMPONENTS

CROSS-REFERENCE TO RELATED APPLICATIONS

This application claims priority under 35 U.S.C. § 119(e) to U.S. Provisional Patent Application 63/055,278, filed Jul. 22, 2020, entitled VEHICLE-BASED UTILITY LOCATING USING PRINCIPAL COMPONENTS, the content of which is incorporated by reference herein in its entirety for all purpose.

FIELD

This present disclosure relates generally to systems for locating and mapping buried utility lines. More specifically but not exclusively, the present disclosure relates generally to vehicle-based systems using principal components for locating and mapping buried utility lines.

BACKGROUND

There are many situations where it is desirable to locate buried utilities such as electrical power lines, water and sewer lines, gas lines, telecommunication lines, or the like. For instance, excavation of buried utility lines for repair, improvement, or for purposes of new construction may require the location of such utilities to be precisely known so as to avoid costly destruction to infrastructure and potential harm to human wellbeing. Accordingly, the locating and mapping of utility lines is essential to prevent such problems.

Many solutions to locating and mapping buried utility lines have been proposed in the field. Such solutions known in the art generally include the use of one or more human portable devices referred to as "utility locator devices," "locator devices," or "locators" for sensing electromagnetic signals emitted from the utility line or lines. Often such locating operations may use so called "active locating" methods that include coupling of electromagnetic signal onto one or more target utility lines via a transmitter device. An operator, equipped with a utility locator device, may traverse an area of interest while interpreting feedback from the utility locator device to locate and then trace a target utility or utilities at the ground level. Whereas active locating, in some use scenarios, may be sufficient to locate a target utility line or lines, such methods may be impractical if not impossible in use to map and locate all utility lines in an area of interest. Likewise, such systems are subject to human error in interpreting utility locator device feedback as well as being constrained by the ability of the operator to adequately walk distances throughout the area of interest.

Other human portable utility locator devices known of the art may instead or additionally be configured for "passive locating" or, in other words, utilizing signals already present in the utility line or lines to locate and optionally map utility lines present in an area of interest. For instance, passive locating may utilize signals of opportunity emitted by current inherently flowing through the utility (e.g., power lines, telecommunication lines, or the like) and/or other signals caused by electromagnetic energy that may otherwise by present in the locate area (e.g., AM broadcast radio) that may energize conductive utility lines. Whereas passive locating may allow for the detection of utility lines not actively energized by a transmitter, such methods and associated utility locator devices often fail to be able to use sensed signals to distinguish a target utility line or lines from others present in the area of interest. Few utility locator devices known in the art may be configured for using principal component analysis (PCA) or like techniques for blind signal separation or detection allowing different utility lines to be distinguished from one another. Such utility locator devices may still suffer from problems related to human error as well as still being constrained by the ability of the operator to adequately walk distances throughout the area of interest. Such problems may be profound where the area of interest is large and/or dangerous for humans to access on foot such as busy roadways and intersections. Likewise, those utility locator devices known in the art configured for blind signal detection via PCA or like principal component based techniques are all optimized for being carried by and at human speeds of travel.

Few solutions known in the art suggest vehicle-based electromagnetic locating devices that may include one or more utility locator devices coupled to or built into a vehicle for purposes of sensing electromagnetic signals and determining the location of and mapping utility lines. Whereas such solutions mitigate the hazards associated with entering busy roadways or intersections on foot as well as facilitate ease in traveling distances across large areas of interest, there is a great deal of room to optimize vehicle-based locating solutions. In particular, vehicle-based solutions known in the art either completely fail to distinguish a target utility line or lines from others present in the area of interest or fail to optimize such blind signal separation/detection methods and associated devices.

Accordingly, there is a need in the art to address the above-described as well as other problems.

SUMMARY

This disclosure relates generally to systems for locating and mapping buried utility lines. More specifically but not exclusively, the present disclosure relates generally to vehicle-based systems using principal components for locating and mapping buried utility lines.

For example, in one aspect the disclosure relates to a vehicle-based utility locating device for use with a vehicle, such as an automobile, truck, or other vehicle. The locating device may include, for example, one or more of the elements of; a positioning element including one or more GNSS antennas and associated receivers to receive positioning signals and determine position data of the vehicle-based utility locating device in a world frame, a utility locating element for determining the presence and location or absence of buried utility lines, including: an antenna array to receive AC magnetic fields emitted from one or more buried utilities as the utility locating element is moved through an area of interest and provide antenna array output signals corresponding to the sensed AC magnetic fields; a receiver element having a receiver input operatively coupled to the antenna array output to sample the antenna array output signals and provide, at a receiver output, receiver output signals corresponding to the sensed AC magnetic fields; and a processing element, including one or more processors, operatively coupled to the receiver element receiver output to: receive the receiver output signals and determine principal component values in a plurality of frequency bands; and output data signals representing one or more field vectors corresponding to the eigenvector and eigenvalues of the principal component values so as to be correlated with the position data. The locating device may also include a memory element comprising one or more non-transitory memories for storing output data values, signal data, position and mapping data, and instructions to implement a signal processing method for determining and mapping utility locations on a communicatively coupled processing element, a communication element comprising one or more radio transceivers to communicate data including at least output data values, signal data, and position data relating to determining and mapping utility locations to a communicatively coupled computing device, and a power element to provide electrical power to one or more of the positioning element, the utility locating element, the memory element, and the communication of the vehicle-based utility locating device.

In another aspect the present disclosure relates to a principal component based method for determining the position of and mapping of utility lines with a vehicle-based utility locating device disposed on a vehicle. The method may include, for example, one or more of the steps of; sensing AC magnetic field signals at a plurality of antennas of the vehicle-based locating device as the vehicle traverses an area of interest and providing antenna output signals corresponding to the sensed AC magnetic field signals, receiving and sampling the antenna output signals at a receiver element at a rate of 2 Hz or faster, determining principal component values for a plurality of spaced apart frequency bands based on the sample antenna output signals, determining field vectors characterized by the eigenvector having the largest absolute eigenvalue of the previously determined principal components for each frequency band, separating field vectors from the various frequency bands into different utility lines and/or other signal sources originating from the same object, classifying utility lines into different utility line types based on the separate field vectors, determining position data, correlating utility line data and position data, storing correlated line data and position data, and communicating the correlated line and position data to a computing device for processing and/or displaying of data that includes mapped utility lines. The frequency bands may be arranged into one or more series of evenly spaced apart frequency bands.

In another aspect, the disclosure relates to a method for determining principal components used in utility locating. The method may include, for example, one or more of the steps of; receiving AC magnetic field signals at a plurality of antennas, sampling the received AC magnetic field signal, implementing a principal components analysis algorithm to produce eigenvectors and associated eigenvalues, wherein the dimensionality of the eigensystem is characterized by the quantity of antennas sampled for a plurality of frequency bands, and determining a set of principal components characterized by the dominant eigenvector having the eigenvalue with the largest absolute value in each frequency band.

In another aspect, the disclosure relates to a method for determining principal components used in utility locating, such as with a portable utility locating system or a vehicle-based utility locating system. The method may include, for example, one or more of the steps of; receiving AC magnetic field signals emitted from one or more utilities at a plurality of antennas, sampling the received AC magnetic field signals, implementing a principal components analysis algorithm to produce eigenvectors and associated eigenvalues, wherein the dimensionality of the eigensystem is characterized by the quantity of antennas sampled for a plurality of frequency bands, and determining principal components characterized by one or more eigenvectors in each frequency band prioritized by their corresponding eigenvalues.

In another aspect, the disclosure relates to a method for determining principal components used in utility locating, such as with a portable utility locating system or a vehicle-based utility locating system. The method may include, for example, one or more of the steps of; receiving AC magnetic field signals emitted from one or more utilities at a plurality of antennas, sampling the received AC magnetic field signals using the power iteration method or inverse power method to determine an eigenvector of each first principal component in a plurality of frequency bands, and determining the eigenvalue corresponding to each eigenvector using the Rayleigh quotient.

In another aspect, the disclosure relates to a method for determining principal components used in utility locating, such as with a portable utility locating system or a vehicle-based utility locating system. The method may include, for example, one or more of the steps of; receiving AC magnetic field signals emitted from one or more utilities at a plurality of antennas, sampling the received AC magnetic field signals, processing the sampled AC magnetic field signals using the power iteration method or inverse power method to determine one or more eigenvectors in each of a plurality of frequency bands where the eigenvectors are prioritized by their corresponding eigenvalues, and determining the eigenvalue corresponding to each eigenvector using the Rayleigh quotient.

In another aspect, the disclosure relates to a principal component based method for separating magnetic signals into different utility lines or other signal sources. The method may include, for example, one or more of the steps of; determining principal components across a plurality of frequency bands from sampled magnetic signals received at a plurality of antennas from utility lines, determining field vectors which may be characterized by the eigenvector optionally having the largest absolute value in each frequency band, evaluating similarities and differences in signal content associated with each field vector at each of the plurality of frequency bands, separating field vectors from the various frequency bands into the same utility line and/or other signal source where similarities exist in signal content to within a predetermined threshold, and comparing spatially separated measurement to identify similar eigenvector patterns across frequency bands to match signals to a target utility.

In another aspect, the disclosure relates to a principal component based method for classifying utility lines via a vehicle-based utility locating device. The method may include, for example, one or more of the steps of; determining principal components across one or more series of frequency bands from sampled AC magnetic signals emitted from one or more utilities and received at a plurality of antennas, determining field vectors characterized by the eigenvector having the largest absolute value in each frequency band, identifying separate utility lines by evaluating similarities and differences in signal content based on the field vectors, comparing signal content associated with each individual utility line to a predefined lookup table containing data associating signal content to utility types, and assigning a utility type to each separate utility line based upon fitting lookup table criteria to within a predefined threshold.

In another aspect, the present disclosure relates to a principal component based method for separating magnetic signals into different utility lines or other signal sources originating from the same object. The method may include determining principal components across a plurality of frequency bands, which may be organized into one or more series of spaced apart frequency bands, from sampled magnetic signals received at a plurality of antennas from utility lines and further determining field vectors which may be characterized by the eigenvector optionally having the largest absolute value in each frequency band. In some embodiments, the frequency bands may be evenly spaced apart. In other embodiments, other frequency band schemes may be used including but not limited to the use of variable spacing in one or more series of frequency bands. The method may further include evaluating similarities and differences in signal content associated with each field vector at each of the plurality of frequency bands. Such signal content may include, but should not be limited to, measures of position/location, depth, orientation/pose, signal power, and/or frequency of the utility line/signal source. Further, the method includes separating field vectors from the various frequency bands into the same utility line and/or other signal source where similarities exist in signal content to within a predetermined threshold. The method further may include comparing spatially separated measurements to identify similar eigenvector patterns across frequency bands to match signals to a target utility.

In another aspect, the present disclosure relates to a principal component based method for classifying utility lines via vehicle-based utility locating device. The method may include determining principal components across a plurality of frequency bands, which may be organized into a plurality of frequency bands, from sampled magnetic signals received at a plurality of antennas from utility lines and further determining field vectors which may be characterized by the eigenvector optionally having the largest absolute value in each frequency band. The method may include identifying separate utility lines by evaluating similarities and differences in signal content. Such signal content may include, but should not be limited to, measures of position/location, depth, orientation/pose, signal power, and/or frequency of the utility line/signal source. The method may further include comparing signal content associated with each individual utility line to a lookup table containing data relating signal content to utility types and assigning utility type to each separate utility line based upon fitting lookup table criteria to within a threshold.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Terminology

Figure 1A:
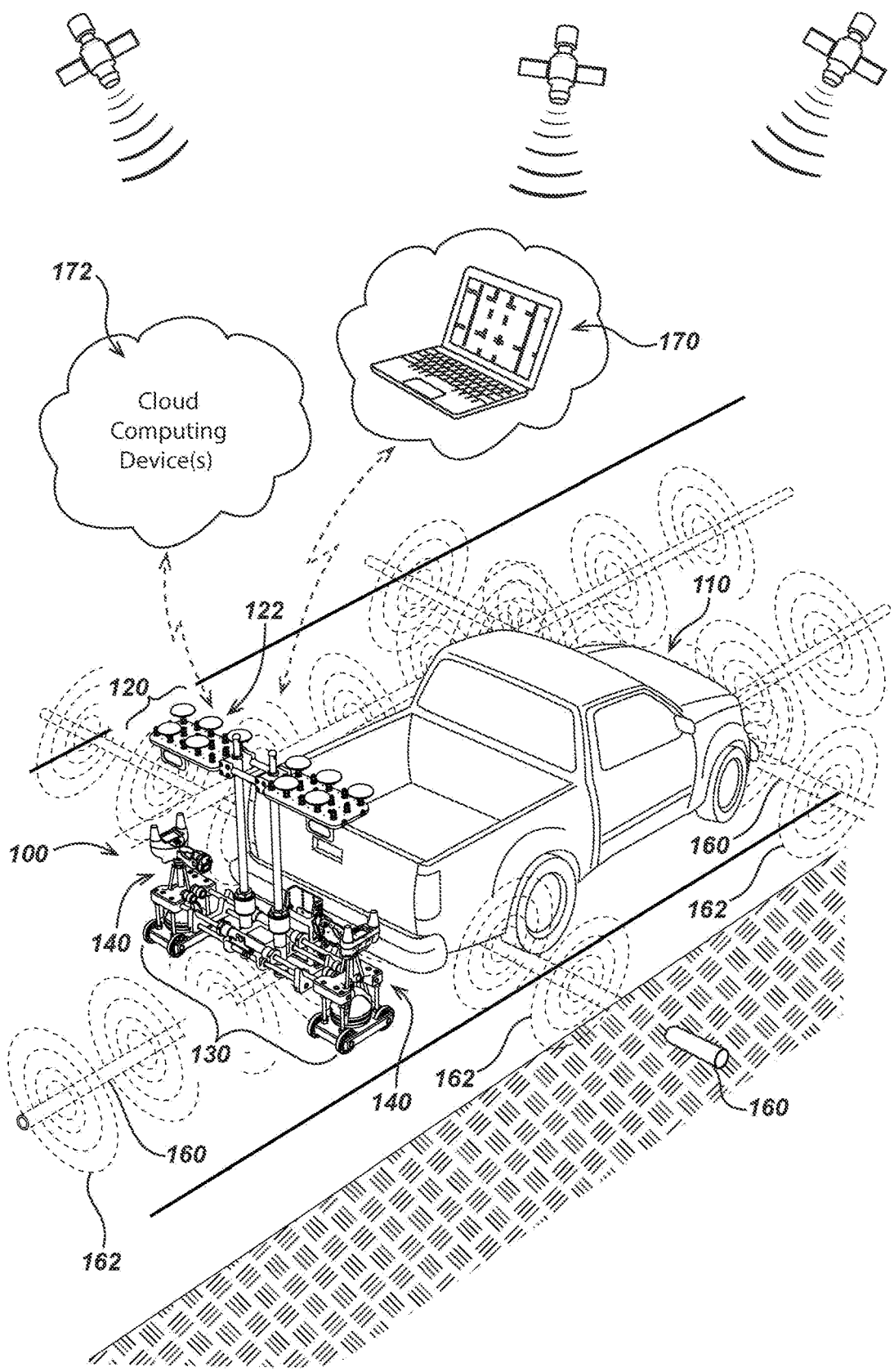
FIG. 1A is an illustration of a vehicle-based utility locating device embodiment used to locate and map utility lines buried in the ground.

The terms "utility lines," "utilities," or "buried utilities" as used herein refers not only to utilities below the surface of the ground, but also to utilities that are otherwise obscured, covered, or hidden from direct view or access (e.g. overhead power lines, underwater utilities, and the like). In a typical application a buried utility is a pipe, cable, conduit, wire, or other object buried under the ground surface, at a depth of from a few centimeters to meters or more, that a user, such as a utility company employee, construction company employee, homeowner or other wants to locate, map (e.g., by surface position as defined by latitude/longitude or other surface coordinates, and/or also by depth), measure, and/or provide a surface mark corresponding to it using paint, electronic marking techniques, images, video or other identification or mapping techniques.

The term "utility data" as used herein, may include, but is not limited to, data pertaining to presence or absence, position, depth, current flow, magnitude, phase, and/or direction, and/or orientation/pose of underground utility lines. The utility data may include a plurality of location data points each indicative of location information pertaining to a buried utility (interchangeably referred to as a "buried utility line") and associated characteristics of the buried utility. The utility data may also include data received from various sensors and systems, such as inertial navigation system (INS) sensors, motion sensors, light detection and radar (LiDAR), systems and sensors and methods relating to simultaneous localization and mapping (SLAM), and other sensors provided within or coupled to the vehicle-based utility locating devices and/or human-portable utility locator devices described herein. The utility data may be in the form of magnetic field signals emitted by utility lines.

The term "area of interest" refers to a geographic region or area that has been or may be scanned for the presence or absence of utility lines buried in the ground. In the present disclosure, such an area of interest may be scanned via a vehicle-based utility locating device embodiment.

The term "magnetic field signals" or "magnetic fields" as used herein may refer to radiation of electromagnetic energy at the area of interest. The magnetic field signals may further refer to radiation of electromagnetic energy from remote transmission sources measurable within the locate area, typically at two or more points. For example, an AM broadcast radio tower used by a commercial AM radio station may transmit a radio signal from a distance that is measurable within the locate operation area.

The term "signal content" may refer to measureable aspects or qualities of the sampled magnetic signals. Such signal content may include, but should not be limited to, measures of signal power, frequency, position including orientation/pose and depth of the measured signal/utility lines. In some method embodiments of the present disclosure, signal content may be used to group signals across the frequency band series together as belonging to the same utility line or other signal source. In further method embodiments, the signal content belonging to the same utility line or other signal source may be used to classify the type of utility.

The term "computing device" as used herein refers to any device or system that can be operated or controlled by electrical, optical, or other outputs from a user interface device. Examples of user electronic devices include, but are not limited to, vehicle-mounted display devices, navigation systems such as global positioning system receivers, personal computers, notebook or laptop computers, personal digital assistants (PDAs), cellular phones, computer tablet devices, electronic test or measurement equipment including processing units, and/or other similar systems or devices.

As used herein, the term "mapping data" refers to imagery, diagrams, graphical illustrations, line drawings or other representations depicting the attributes of a location, which may include maps or images containing various dimensions (i.e. two dimensional maps or images and/or three dimensional maps or images). These may be vector or raster objects and/or combinations of both. Such depictions and/or representations may be used for navigation and/or relaying information associated with positions or locations, and may also contain information associated with the positions or locations such as coordinates, information defining features, images or video depictions, and/or other related data or information. For instance, the spatial positioning of ground surface attributes may be depicted through a series of photographs or line drawings or other graphics representing a location. Various other data may be embedded or otherwise included into maps including, but not limited to, reference coordinate information such as latitude, longitude, and/or altitude data, topographical information, virtual models/ objects, information regarding buried utilities or other associated objects or elements, structures on or below the surface, and the like. The maps may depict a probability contour indicative of likelihood of presence of the buried utilities at a probable location, and other associated information such as probable orientation and depth of the buried utilities. Alternatively or additionally, the map may depict optimized locations of the buried utilities along with associated information such as orientation/pose and depth of the buried utilities.

As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Overview

The present disclosure relates generally to systems for locating and mapping buried utility lines. More specifically but not exclusively, the present disclosure relates generally to vehicle-based systems using principal components for locating and mapping buried utility lines.

In one aspect, the present disclosure relates to a vehicle-based utility locating device for identifying and mapping buried utilities. The vehicle-based utility locating device may include a position element including one or more GNSS antennas and associated receivers to determine position data of the vehicle-based utility locating device in the world frame as well as a utility locating element for sensing electromagnetic signals and using the sensed electromagnetic signals to determine the presence and location or absence of buried utility lines. The utility locating element may further include an antenna array to sense magnetic fields emitted from one or more buried utilities as the utility locating element is moved through an area of interest and provide antenna array output signals corresponding to the sensed magnetic fields. The vehicle-based utility locating device may further include a receiver element having a receiver input to sample the antenna array output signals and provide receiver output signals corresponding to the sensed magnetic fields. The receiver element may sample the output signals at 2 Hz or faster. A processing element having one or more processors coupled to the receiver element may receive the receiver output signals and determine principal components in a plurality of frequency bands where the frequency bands may be organized into one or more series of spaced apart frequency bands and output data signals representing one or more field vectors corresponding to the eigenvector and eigenvalues of the principal components which may be further correlated with position data. The frequency bands may have a bandwidth of 5 kHz or less. The frequency bands may, in some embodiments, be evenly spaced apart. In other embodiments, variable spacing in one or more series of frequency bands may be used and/or other frequency band spacing schemes. Each frequency band may be calibrated about the mid-point of the band. The vehicle-based utility locating device may further include a memory element comprising one or more non-transitory memories for storing output data values, signal data, position and mapping data, and instructions relating to methods for determining principal components and/or other methods for determining and mapping utility locations methods and a communication element comprising one or more radio transceivers to communicate data including output data values, signal data, position data, and other data relating to determining and mapping utility locations methods to a computing device. The vehicle-based utility locating devices described herein may be used in combination with narrow band filter. Likewise, the vehicle-based utility locating devices described herein may be used with wide band radio broadcast signals.

In another aspect, the vehicle-based utility locating device of the present disclosure may utilize the field vector at each of the frequency bands to distinguish between different utility lines or other signal sources originating from the same object. Likewise, the utility type of the various determined utility lines may further be classified via the signal content (e.g., measures of frequency, power, position and depth in the ground, and/or orientation/pose of the signals associated with each utility line), optionally relative to the other frequencies or the same frequency at different times.

In another aspect, the utility locating element of vehicle-based utility locating devices of the present disclosure may be or include one or more human portable utility locator devices. In some embodiments, the utility locating element of the vehicle-based utility locating device, which may be or include one or more human portable utility locator devices, as well as other device elements may be removably coupled to a vehicle. In other e embodiments, the utility locating and various other elements of the vehicle-based utility locating device may instead be built into, or integrated onto, the vehicle.

In another aspect, the present disclosure relates to a principal component based method for determining the position of and mapping utility lines via a vehicle-based utility locating device. The method may include sensing magnetic signals at a plurality of antennas as the vehicle-based locating device traverses an area of interest. A receiver element may sample the magnetic signals at 2 Hz or faster. The method may further include determining principal components for a plurality of frequency bands, which may be organized into one or more series of spaced apart frequency bands, which optionally may be evenly spaced apart, and further determining field vectors which may be characterized by the eigenvector optionally having the largest absolute eigenvalue of the previously determined principal components for each frequency band. The method may further include separating field vectors from the various frequency bands into different utility lines and/or other signal sources originating from the same object. From the separated utility lines, the method may further include classifying utility lines into different utility line types optionally based on eigenvector patterns. Position data may be determined by the vehicle-based utility locating device and such position data may further be correlated with utility line data. Such position data may include positions and related data produced via global navigation satellite system (GNSS) and may further include data produced via other position sensors and systems including, but not limited to, inertial navigation system (INS) sensors, light detection and ranging (LiDAR), wheel counting mechanisms or other ground tracking mechanism, and/or other like sensors/systems. Further, such position data may include that generated via sensors and methods associated with simultaneous localization and mapping (SLAM). Utility line and correlated position data may further be stored on one or more non-transitory memories. The method may further include communicating data to a computing device for processing and/or displaying of data that includes mapped utility lines. Likewise, the data may be communicated to one or more cloud computing devices.

In another aspect, the present disclosure relates to a method for determining the principal component across a plurality of frequency bands as used in locating and mapping utility lines. The method may include sampling magnetic signals at a plurality of antennas, performing Principal Component Analysis to produce eigenvectors with associated eigenvalues wherein the dimensionality of the eigensystem is characterized by the quantity of antennas sampled for a plurality a frequency bands, and finding the principal components which may be characterized by the dominant eigenvector optionally having the eigenvalue with the greatest absolute value. The frequency bands may be organized into one or more series of spaced apart frequency bands. The frequency bands may, in some embodiments, be evenly spaced apart. In other embodiments, variable spacing in one or more series of frequency bands may be used.

In another aspect, the present disclosure relates to another method for determining the principal component across a plurality of frequency bands as used in locating and mapping utility lines. The method may include sampling magnetic signals at a plurality of antennas, performing Principal Component Analysis to produce eigenvectors with associated eigenvalues wherein the dimensionality of the eigensystem is characterized by the quantity of antennas sampled for a plurality a frequency bands, and finding the principal components which may be characterized by one or more eigenvectors in each frequency band prioritized by corresponding eigenvalues.

In another aspect, the present disclosure relates to a computationally efficient method for determining the principal component across a plurality of frequency bands as used in locating and mapping utility lines which may optionally be used for near real-time display. The method may include sampling magnetic signals at a plurality of antennas, optionally performing Power Iteration Method or Inverse Power Method or other similar technique to determine the eigenvector of each first principal component in a plurality of frequency bands, and optionally using the Rayleigh quotient to determine eigenvalue corresponding to each eigenvector. The frequency bands may be organized into one or more series of individual frequency bands.

In another aspect, the present disclosure relates to another computationally efficient method for determining the principal component across a plurality of frequency bands as used in locating and mapping utility lines. The method may include sampling magnetic signals at a plurality of antennas, optionally performing Power Iteration Method or Inverse Power Method or other similar technique to determine one or more eigenvectors for each frequency band prioritized by their corresponding eigenvalues, and optionally using the Rayleigh quotient to determine eigenvalue corresponding to each eigenvector.

In another aspect the disclosure relates to a vehicle-based utility locating device for use with a vehicle, such as an automobile, truck, or other vehicle. The locating device may include, for example, one or more of the elements of; a positioning element including one or more GNSS antennas and associated receivers to receive positioning signals and determine position data of the vehicle-based utility locating device in a world frame, a utility locating element for determining the presence and location or absence of buried utility lines, including: an antenna array to receive AC magnetic fields emitted from one or more buried utilities as the utility locating element is moved through an area of interest and provide antenna array output signals corresponding to the sensed AC magnetic fields; a receiver element having a receiver input operatively coupled to the antenna array output to sample the antenna array output signals and provide, at a receiver output, receiver output signals corresponding to the sensed AC magnetic fields; and a processing element, including one or more processors, operatively coupled to the receiver element receiver output to: receive the receiver output signals and determine principal component values in a plurality of frequency bands; and output data signals representing one or more field vectors corresponding to the eigenvector and eigenvalues of the principal component values so as to be correlated with the position data. The locating device may also include a memory element comprising one or more non-transitory memories for storing output data values, signal data, position and mapping data, and instructions to implement a signal processing method for determining and mapping utility locations on a communicatively coupled processing element, a communication element comprising one or more radio transceivers to communicate data including at least output data values, signal data, and position data relating to determining and mapping utility locations to a communicatively coupled computing device, and a power element to provide electrical power to one or more of the positioning element, the utility locating element, the memory element, and the communication of the vehicle-based utility locating device.

Ones of frequencies in the plurality of frequency bands may, for example, be spaced-apart in one or more series of frequency bands. The antenna array output signals may be sampled at speeds of 2 Hz or faster. Each frequency band may have a bandwidth of 2 kHz or less. Each frequency band may be calibrated at the mid-point of the band. The contents of the frequency bands may be used to provide data defining two or more different utility lines. The contents of the frequency bands may be used to provide data classifying two or more different utility lines. The utility locating element may be or may include one or more human portable utility locator devices mechanically coupled to the vehicle. One or more of the elements of the vehicle-based utility locating device may be removably coupled to the vehicle or alternately may be built into the vehicle.

In another aspect the present disclosure relates to a principal component based method for determining the position of and mapping of utility lines with a vehicle-based utility locating device disposed on a vehicle. The method may include, for example, one or more of the steps of; sensing AC magnetic field signals at a plurality of antennas of the vehicle-based locating device as the vehicle traverses an area of interest and providing antenna output signals corresponding to the sensed AC magnetic field signals, receiving and sampling the antenna output signals at a receiver element at a rate of 2 Hz or faster, determining principal component values for a plurality of spaced apart frequency bands based on the sample antenna output signals, determining field vectors characterized by the eigenvector having the largest absolute eigenvalue of the previously determined principal components for each frequency band, separating field vectors from the various frequency bands into different utility lines and/or other signal sources originating from the same object, classifying utility lines into different utility line types based on the separate field vectors, determining position data, correlating utility line data and position data, storing correlated line data and position data, and communicating the correlated line and position data to a computing device for processing and/or displaying of data that includes mapped utility lines. The frequency bands may be arranged into one or more series of evenly spaced apart frequency bands.

In another aspect, the disclosure relates to a method for determining principal components used in utility locating. The method may include, for example, one of more of the steps of; receiving AC magnetic field signals at a plurality of antennas, sampling the received AC magnetic field signal, implementing a principal components analysis algorithm to produce eigenvectors and associated eigenvalues, wherein the dimensionality of the eigensystem is characterized by the quantity of antennas sampled for a plurality of frequency bands, and determining a set of principal components characterized by the dominant eigenvector having the eigenvalue with the largest absolute value in each frequency band.

In another aspect, the disclosure relates to a method for determining principal components used in utility locating, such as with a portable utility locating system or a vehicle-based utility locating system. The method may include, for example, one or more of the steps of; receiving AC magnetic field signals emitted from one or more utilities at a plurality of antennas, sampling the received AC magnetic field signals, implementing a principal components analysis algorithm to produce eigenvectors and associated eigenvalues, wherein the dimensionality of the eigensystem is characterized by the quantity of antennas sampled for a plurality of frequency bands, and determining principal components characterized by one or more eigenvectors in each frequency band prioritized by their corresponding eigenvalues.

In another aspect, the disclosure relates to a method for determining principal components used in utility locating, such as with a portable utility locating system or a vehicle-based utility locating system. The method may include, for example, one or more of the steps of; receiving AC magnetic field signals emitted from one or more utilities at a plurality of antennas, sampling the received AC magnetic field signals using the power iteration method or inverse power method to determine an eigenvector of each first principal component in a plurality of frequency bands, and determining the eigenvalue corresponding to each eigenvector using the Rayleigh quotient.

In another aspect, the disclosure relates to a method for determining principal components used in utility locating, such as with a portable utility locating system or a vehicle-based utility locating system. The method may include, for example, one or more of the steps of; receiving AC magnetic field signals emitted from one or more utilities at a plurality of antennas, sampling the received AC magnetic field signals, processing the sampled AC magnetic field signals using the power iteration method or inverse power method to determine one or more eigenvectors in each of a plurality of frequency bands where the eigenvectors are prioritized by their corresponding eigenvalues, and determining the eigenvalue corresponding to each eigenvector using the Rayleigh quotient.

In another aspect, the disclosure relates to a principal component based method for separating magnetic signals into different utility lines or other signal sources. The method may include, for example, one or more of the steps of; determining principal components across a plurality of frequency bands from sampled magnetic signals received at a plurality of antennas from utility lines, determining field vectors which may be characterized by the eigenvector optionally having the largest absolute value in each frequency band, evaluating similarities and differences in signal content associated with each field vector at each of the plurality of frequency bands, separating field vectors from the various frequency bands into the same utility line and/or other signal source where similarities exist in signal content to within a predetermined threshold, and comparing spatially separated measurement to identify similar eigenvector patterns across frequency bands to match signals to a target utility.

The frequency bands may, for example, be organized into one or more series of evenly spaced apart frequency bands. The signal content may include a measure of signal power of the utility line/signal source. The signal content may include a measure of signal frequency of the utility line/signal source. The signal content may include a measure of position of the utility line/signal source. The signal content may include a measure of orientation/pose of the utility line/signal source.

In another aspect, the disclosure relates to a principal component based method for classifying utility lines via a vehicle-based utility locating device. The method may include, for example, one or more of the steps of; determining principal components across one or more series of frequency bands from sampled AC magnetic signals emitted from one or more utilities and received at a plurality of antennas, determining field vectors characterized by the eigenvector having the largest absolute value in each frequency band, identifying separate utility lines by evaluating similarities and differences in signal content based on the field vectors, comparing signal content associated with each individual utility line to a predefined lookup table containing data associating signal content to utility types, and assigning a utility type to each separate utility line based upon fitting lookup table criteria to within a predefined threshold.

The frequency bands may, for example, be organized into one or more series of evenly spaced apart frequency bands. The signal content may include a measure of signal power of the utility line/signal source. The signal content may include a measure of signal frequency of the utility line/signal source. The signal content may include a measure of position of the utility line/signal source. The signal content may include a measure of orientation/pose of the utility line/signal source.

In another aspect, the present disclosure relates to a principal component based method for separating magnetic signals into different utility lines or other signal sources originating from the same object. The method may include determining principal components across a plurality of frequency bands, which may be organized into one or more series of spaced apart frequency bands, from sampled magnetic signals received at a plurality of antennas from utility lines and further determining field vectors which may be characterized by the eigenvector optionally having the largest absolute value in each frequency band. In some embodiments, the frequency bands may be evenly spaced apart. In other embodiments, other frequency band schemes may be used including but not limited to the use of variable spacing in one or more series of frequency bands. The method may further include evaluating similarities and differences in signal content associated with each field vector at each of the plurality of frequency bands. Such signal content may include, but should not be limited to, measures of position/location, depth, orientation/pose, signal power, and/or frequency of the utility line/signal source. Further, the method includes separating field vectors from the various frequency bands into the same utility line and/or other signal source where similarities exist in signal content to within a predetermined threshold. The method further may include comparing spatially separated measurements to identify similar eigenvector patterns across frequency bands to match signals to a target utility.

In another aspect, the present disclosure relates to a principal component based method for classifying utility lines via vehicle-based utility locating device. The method may include determining principal components across a plurality of frequency bands, which may be organized into a plurality of frequency bands, from sampled magnetic signals received at a plurality of antennas from utility lines and further determining field vectors which may be characterized by the eigenvector optionally having the largest absolute value in each frequency band. The method may include identifying separate utility lines by evaluating similarities and differences in signal content. Such signal content may include, but should not be limited to, measures of position/location, depth, orientation/pose, signal power, and/or frequency of the utility line/signal source. The method may further include comparing signal content associated with each individual utility line to a lookup table containing data relating signal content to utility types and assigning utility type to each separate utility line based upon fitting lookup table criteria to within a threshold.

Various additional aspects of the present disclosure are described subsequently herein.

Details of the systems, devices, and methods referred to herein and additional components, methods, and configurations that may be used in conjunction with the embodiments described herein are disclosed in co-assigned patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/769,202, filed Feb. 15, 2013, entitled SMART PAINT STICK DEVICES AND METHODS; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. Pat. No. 9,632,199, issued Apr. 25, 2017, entitled INDUCTIVE CLAMP DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/345,421, filed Nov. 7, 2016, entitled OMNI-INDUCER TRANSMITTING DEVICES AND METHODS; U.S. Pat. No. 9,488,747, issued Nov. 8, 2016, entitled DUAL ANTENNA SYSTEMS WITH VARIABLE POLARIZATION; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. patent application Ser. No. 15/633,682, filed Jun. 26, 2017, entitled BURIED OBJECT LOCATING DEVICES AND METHODS; U.S. Pat. No. 9,696,448, filed Jul. 4, 2017, entitled GROUND-TRACKING DEVICES AND METHODS FOR USE WITH A UTILITY LOCATOR; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,784,837, issued Oct. 10, 2017, entitled OPTICAL ROUND TRACKING APPARATUS, SYSTEMS AND METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND TRACKING APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, filed Dec. 18, 2017, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,880,309, issued Jan. 30, 2018, entitled UTILITY LOCATOR TRANSMITTER APPARATUS AND METHODS; #U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 9,928,613, issued Mar. 27, 2018, entitled GROUND TRACKING APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 10,027,526, issued Jul. 17, 2018, entitled METHODS AND APPARATUS FOR HIGH-SPEED DATA TRANSFER EMPLOYING SELF-SYNCHRONIZING QUADRATURE AMPLITUDE MODULATION (QAM);

U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. Pat. No. 10,073,186, issued Sep. 11, 2018, entitled KEYED CURRENT SIGNAL UTILITY LOCATING SYSTEMS AND METHODS; U.S. Pat. No. 10,078,149, issued Sep. 18, 2018, entitled BURIED OBJECT LOCATOR APPARATUS AND SYSTEMS; U.S. Pat. No. 10,082,599, issued Sep. 25, 2018, entitled MAGNETIC SENSING BURIED OBJECT LOCATOR INCLUDING A CAMERA; U.S. patent application Ser. No. 16/144,878, filed Sep. 27, 2018, entitled MULTIFUNCTION BURIED UTILITY LOCATING CLIPS; U.S. patent application Ser. No. 16/178,494, filed Nov. 1, 2018, entitled THREE-AXIS MEASUREMENT MODULES AND SENSING METHODS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent Ser. No. 16/449,187, filed Jun. 21, 2019, entitled ACTIVE MARKER DEVICES FOR UNDERGROUND USE; U.S. Pat. No. 10,247,845, issued Apr. 2, 2019, entitled UTILITY LOCATOR TRANSMITTER APPARATUS AND METHODS; U.S. Utility patent application Ser. No. 16/382,136, filed Apr. 11, 2019, entitled GEOGRAPHIC MAP UPDATING METHODS AND SYSTEMS; U.S. Pat. No. 10,274,632, issued Apr. 30, 2019, entitled UTILITY LOCATING SYSTEMS WITH MOBILE BASE STATION; U.S. Provisional Patent Application 62/870,443, filed Jul. 3, 2019, entitled AUTOTUNING MODULES; U.S. Pat. No. 10,353,103, filed Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. Pat. No. 10,401,526, issued Sep. 3, 2019, entitled BURIED UTILITY MARKER DEVICES, SYSTEMS, AND METHODS; U.S. Provisional Patent Application 62/899,296, filed Sep. 12, 2019, entitled ANTENNA SYSTEMS FOR CIRCULARLY POLARIZED RADIO SIGNALS; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UTILITY LOCATING IN A MULTI-UTILITY ENVIRONMENT; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,569,951, issued Feb. 25, 2020, entitled MARKING PAINT APPLICATOR FOR USE WITH PORTABLE UTILITY LOCATOR; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEM; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. Provisional Patent Application 63/012,480, filed Apr. 20, 2020, UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,249, filed Jun. 15, 2020, entitled USER INTERFACES FOR UTILITY LOCATORS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Provisional Patent Application 63/072,169, filed Aug. 30, 2020, entitled COMBINED SATELLITE NAVIGATION AND RADIO TRANSCEIVER ANTENNA DEVICES; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. Pat. No. 10,777,919, issued Sep. 15, 2020, entitled MULTIFUNCTION BURIED UTILITY LOCATING CLIPS; U.S. patent application Ser. No. 17/068,156, filed Oct. 12, 2020, entitled DUAL SENSED LOCATING SYSTEMS AND METHODS; U.S. Provisional Patent Application 63/091,637, filed Oct. 14, 2020, entitled ELECTRONIC MARKER-BASED NAVIGATION SYSTEMS AND METHODS FR USE IN GNSS-DEPRIVED ENVIRONMENTS; U.S. Pat. No. 10,809,408, issued Oct. 20, 2020, entitled DUAL SENSED LOCATING SYSTEMS AND METHODS; U.S. patent application Ser. No. 17/099,419, filed Nov. 16, 2020, entitled PHASE-SYNCHRONIZED BURIED OBJECT TRANSMITTER AND LOCATOR METHODS AND APPARATUS; U.S. Provisional Patent Application 63/115,009, filed Nov. 17, 2020, entitled SIGNAL TRANSMITTER CONNECTION PORT FOR WIRELESS INSPECTION PORT FOR WIRELESS INSPECTION AND LOCATING SYSTEM; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Provisional Patent Application 63/120,477, filed Dec. 2, 2020, entitled COLOR-INDEPENDENT MARKER DEVICES APPARATUS, METHODS, AND SYSTEMS; U.S. Pat. No. 10,859,727, issued Dec. 8, 2020, entitled ELECTRONIC MARKER DEVICES AND SYSTEMS; U.S. patent application Ser. No. 17/157,983, filed Jan. 25, 2021, entitled SELF-STANDING MULTI-LEG ATTACHMENT DEVICES FOR USE WITH UTILITY LOCATORS; U.S. Pat. No. 10,908,311, issued Feb. 2, 2021, entitled SELF-STANDING MULTI-LEG ATTACHMENT DEVICES FOR USE WITH UTILITY LOCATORS; U.S. patent application Ser. No. 17/175,594, filed Feb. 12, 2021, entitled KEYED CURRENT SIGNAL UTILITY LOCATING SYSTEMS AND METHODS; U.S. patent application Ser. No. 17/182,123, filed Feb. 22, 2021, entitled UTILITY LOCATING SYSTEM WITH MOBILE BASE STATION; U.S. Pat. No. 10,928,538, issued Feb. 23, 2021, entitled KEYED CURRENT SIGNAL UTILITY LOCATING SYSTEMS AND METHODS; U.S. Pat. No. 10,935,686, issued Mar. 2, 2021, entitled UTILITY LOCATING SYSTEM WITH MOBILE BASE STATION; U.S. Provisional Patent Application 63/156,355, filed Mar. 4, 2021, entitled ANTENNAS, MULTI-ANTENNA APPARATUS, AND ANTENNA HOUSINGS; U.S. patent application Ser. No. 17/228,661, filed Apr. 12, 2021, entitled MAGNETIC UTILITY LOCATOR DEVICES AND METHODS; U.S. patent application Ser. No. 17/234,674, filed Apr. 19, 2021, entitled UTILITY LOCATOR APPARATUS AND SYSTEMS; U.S. Pat. No. 10,983,239, issued Apr. 20, 2021, entitled MULTI-FREQUENCY LOCATING SYSTEMS AND METHODS; U.S. Pat. No. 10,983,240, issued Apr. 20, 2021, entitled MAGNETIC UTILITY LOCATOR DEVICES AND METHODS; U.S. patent application Ser. No. 17/235,507, filed Apr. 20, 2021, entitled UTILITY LOCATING DEVICES EMPLOYING MULTIPLE SPACED APART GNSS ANTENNAS; U.S. Pat. No. 10,989,830, issued Apr. 27, 2021, entitled UTILITY LOCATOR APPARATUS AND SYSTEMS; U.S. patent application Ser. No. 17/241,676, filed Apr. 27, 2021, entitled SPATIALLY AND PROCESSING-BASED DIVERSE REDUNDANCY FOR RTK POSITIONING AND OTHER POSITIONING SYSTEMS AND METHODS; U.S. patent application Ser. No. 17/322,525, filed May 17, 2021, entitled MARKING PAINT APPLICATOR APPARATUS; U.S. Pat. No. 11,014,734, issued May 25, 2021, entitled MARKING PAINT APPLICATOR APPARATUS; U.S. patent application Ser. No. 17/334,123, filed May 28, 2021, entitled UTILITY LOCATOR APPARATUS, SYSTEMS, AND METHODS; and U.S. Pat. No. 11,029,439, issued Jun. 8, 2021, entitled UTILITY LOCATOR APPARATUS, SYSTEMS, AND METHODS. The content of each of the above-described patents and applications is incorporated by reference herein in its entirety. The above-described patent applications and patents may be referred to herein collectively as the "co-assigned applications" or "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

Exemplary Embodiments

Figure 1B:
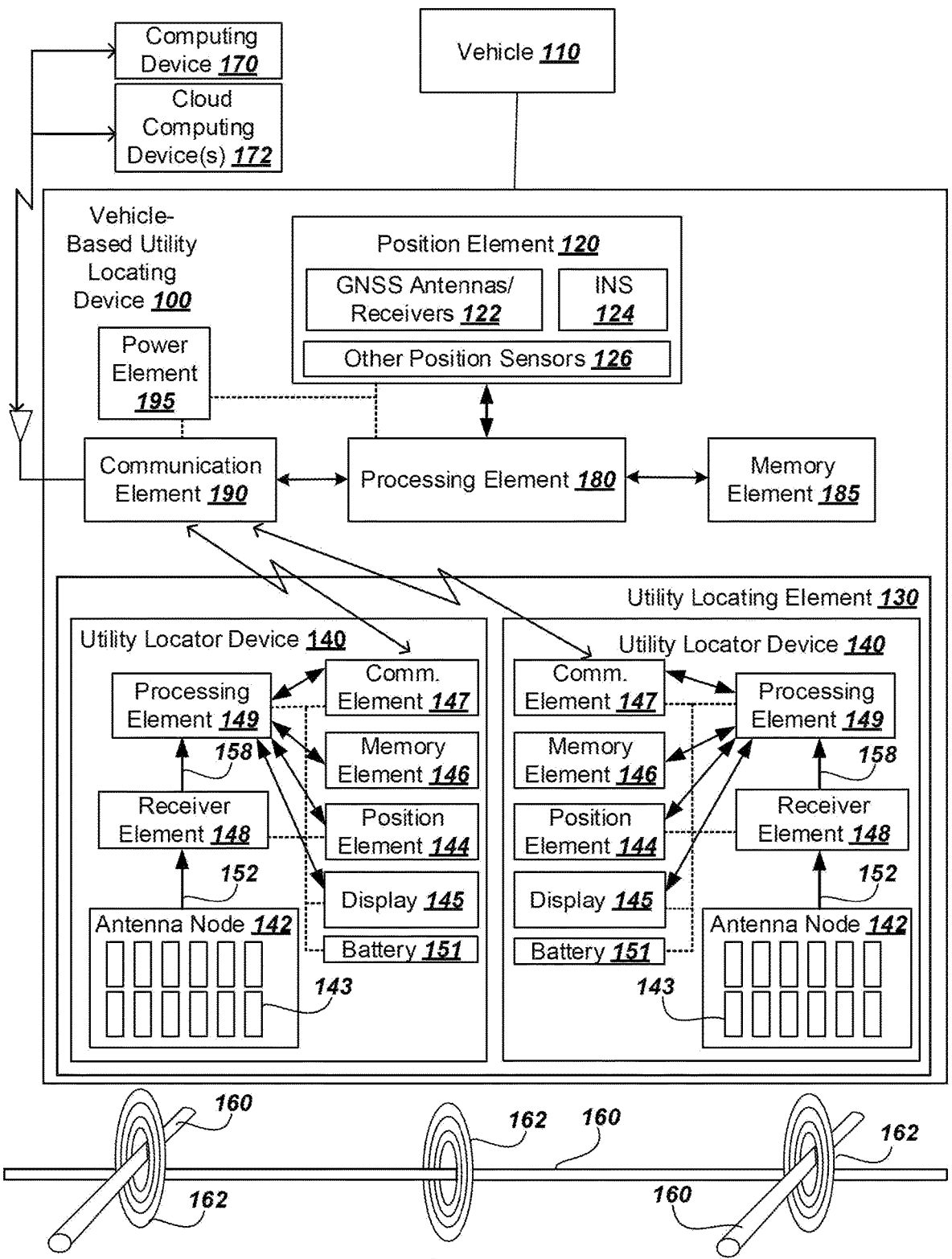
FIG. 1B is a diagram of the vehicle-based utility locating device embodiment of FIG. 1A.

Turning to FIGS. 1A and 1B, a vehicle-based utility locating device 100 is illustrated that may be secured to a vehicle 110. The vehicle-based utility locating device 100 may include a position element 120 including one or more GNSS antennas and associated receivers, such as the GNSS antennas/receivers 122, to determine position data of the vehicle-based utility locating device in the world frame. Likewise, the position element may include one or more other sensors or systems to determine position. For instance, as illustrated in FIG. 1B, the position element 120 may further include one or more inertial navigation system (INS) sensors 124 that includes gyroscopic sensors, accelerometers, magnetometers, or the like and/or other position sensors 126 for determining movement or position in the world frame (e.g., light detection and radar (LiDAR) systems, other rangefinders, optical or mechanical ground tracking devices, or the like as well as systems, sensors, and methods associated with simultaneous localization and mapping (SLAM) or similar techniques). Different position sensors and systems may be included in other vehicle-based utility locating device embodiments in keeping with the present disclosure.

The vehicle-based utility locating device 100 may further include a utility locating element 130 for sensing electromagnetic signals that may be emitted by one or more utility lines that may be buried in the ground and use the sensed electromagnetic signals to determine the presence and location or absence of buried utility lines. In the vehicle-based utility locating device 100, the utility locating element 130 may be or include one or more human-portable utility locator devices 140 such as those described in the incorporated patent applications including, but not limited to, U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,078,149, issued Sep. 18, 2018, entitled BURIED OBJECT LOCATOR APPARATUS AND SYSTEMS; and U.S. Pat. No. 10,162,074, issued Dec. 25, 2018, entitled UTILITY LOCA-

TORS WITH RETRACTABLE SUPPORT STRUCTURES AND APPLICATIONS THEREOF.

Figure 2A:
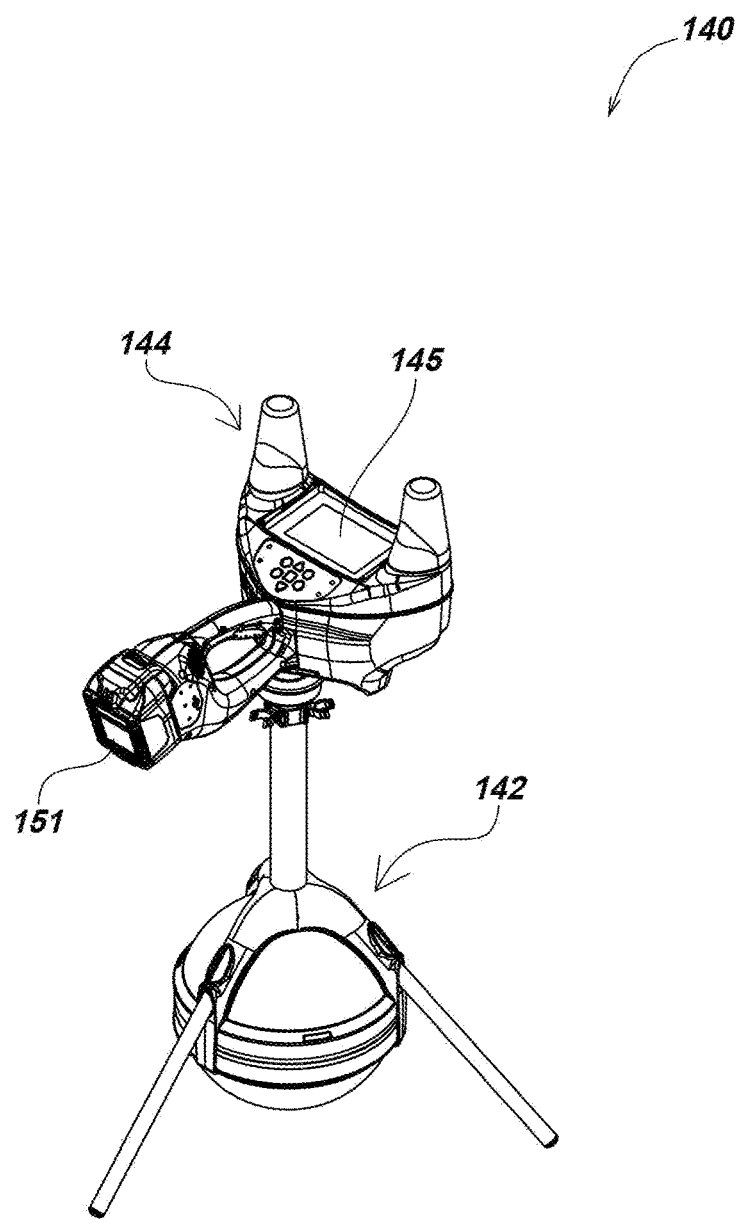
FIG. 2A is an isometric view of a human-portable utility locator device that may be used in the vehicle-based utility locating device embodiment of FIGS. 1A and 1B.
Figure 2B:
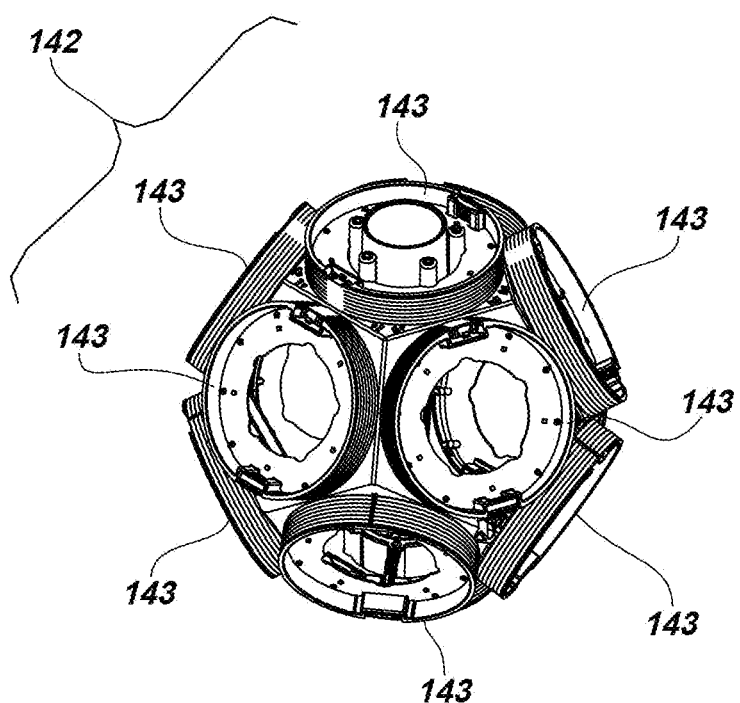
FIG. 2B is a detailed view of the antenna array from the human-portable utility locator device embodiment of FIG. 2A.

As shown in greater detail in FIG. 2A, each human-portable utility locator device 140 may include an antenna node 142 to sense magnetic fields 162 (FIGS. 1A and 1B) emitted from one or more buried utility lines such as utility line 160 (FIGS. 1A and 1B) as the vehicle-based utility locating device 100 (FIGS. 1A and 1B) is moved through an area of interest. Further illustrated in FIG. 2B, the antenna node 142 (FIGS. 1A and 2A) may house a dodecahedral array of antennas 143. In other vehicle-based utility locating device or utility locator device embodiments, a different number of antennas may be used that may be arranged in different ways.

Further illustrated in FIG. 2A, the utility locator device 140 may further include a position element 144 comprising one or more systems and sensors to determine position and movement. For instance, the utility locator device 140 may include a position element 144 that may include an array of GNSS antennas and associated receivers to receive satellite navigation signals and determine positions of the utility locator devices 140 in the world frame. Likewise, the position element 144 of the utility locator device 140 may include a variety of other position sensors/systems including, but not limited to, one or more accelerometers, gyroscopes, magnetometers, altimeters, other inertial sensors, LiDAR or other rangefinders, optical or mechanical ground tracking apparatus, or the like as well as systems, sensors, and methods associated with SLAM and/or other methods and systems. Such position data may be further correlated with utility line data and displayed on a display 145 on each utility locator device 140 and/or a computing device 170 (FIGS. 1A and 1B) to communicate mapped utility line data to a user. Likewise, such data may be communicated to one or more cloud computing devices 172 for storage, processing, mapping of utility and related data, providing data for display, and/or the like.

In use in the vehicle-based utility locating device 100, as illustrated in FIG. 1B, the position elements 144 of each utility locator device 140 may be used for positioning in conjunction with the position element 120 of the vehicle-based utility locating device 100. Likewise, the positioning may be done solely in the positioning element 120 of the vehicle-based utility locating device 100 or solely in the position elements 144 of each utility locator device 140.

Further illustrated in FIG. 1B, each utility locator device 140 may include a memory element 146 comprising one or more non-transitory memories for storing output data values, signal data, position and mapping data, and instructions relating to PCA or other methods for determining principal components and mapping utility locations methods and/or function of the utility locator device 140. The utility locator device 140 may further include a communication element 147 comprising one or more radio transceivers for communicating data with the vehicle-based utility locating device 100 and/or other devices such as the computing device 170 or remote cloud based devices such as the cloud computing device(s) 172. For instance, the communication element 147 may be or include a 5G or like cellular radio transceiver to communicate such data. Each human-portable utility locator devices 140 may further include a battery 151 for providing electrical power to the various powered elements of the human-portable utility locator devices 140. In some embodiments, such electrical power may be provided to each human-portable utility locator devices 140 from the vehicle-based utility locating device 100 or vehicle 110.

Further illustrated in FIG. 1B, the antennas 143 of antenna node 142 may provide antenna array output signals 152 corresponding to the sensed magnetic fields 162 from utility line 160. The magnetic field 162 signals may, in some embodiments, include that caused by wide band radio broadcast signals coupling to the utility line 160. A receiver element 148 comprising one or more receivers may receive the antenna array output signals 152. The receiver element 148 may include one or more filters and signal conditioners to receive the antenna array output signals 152 and generate receiver output signals 158. For instance, such filters may be or include narrow band filter (not illustrated). The receiver output signals 158 may be sampled at a processing element 149 at 2 Hz or faster. The processing element 149, comprising one or more processors, may receive the receiver output signals 158 and determine principal components frequency bands which may be organized into one or more frequency bands such as the frequency band scheme 400 of FIG. 4 or the frequency band scheme 500 of FIG. 5 or other frequency band scheme. Such processing may instead be or be shared by a processing element 180 otherwise disposed in the vehicle-based utility locating device 100 and/or a processing element disposed in a connected computing device 170 in real-time, near real-time, or in post processing. Likewise, such data may be communicated to one or more cloud computing devices 172 for storage, processing, mapping of utility and related data, providing data for display, and/or the like via a communication element 190 in the vehicle-based utility locating device 100. For instance, the communication element 190 may be or include a 5G or like cellular radio transceiver to communicate such data. The processing element 149, processing element 180, or other connected processing element may generate output data signals representing one or more field vectors corresponding to the eigenvector and eigenvalues of the principal components which may be further correlated with position data from the position element 120 and/or position element 144 of the utility locator devices 140. For instance, the processing element 149, processing element 180, or other connected processing element may carry out the method 600 of FIG. 6, method 700 of FIG. 7A, method 710 of FIG. 7B, method 750 of FIG. 7C, method 760 of FIG. 7D, method 800 of FIG. 8, and/or method 900 of FIG. 9 to determine and map utility lines using principal components that may be used with the vehicle-based utility locating devices of the present disclosure.

The vehicle-based utility locating devices in keeping with the present disclosure may further include a memory element, such as the memory element 185 of vehicle-based utility locating device 100 of FIG. 1B, comprising one or more non-transitory memories for storing output data values, signal data, position and mapping data, and instructions relating to PCA or other methods for determining principal components and mapping utility locations methods. In some embodiments, such a memory element may instead be disposed in a human portable utility locator device such as the memory element 146 of the human portable utility locator device 130. The vehicle-based utility locating device 100 of FIG. 1B may include a communication element 190 comprising one or more radio transceivers to communicate data including output data values, signal data, position data, and other data relating to determining and mapping utility locating methods to a computing device such as computing device 170 as well as the utility locator devices 140 or remote cloud based devices such as the cloud computing device(s) 172. Further, a power element 195 may provide electrical power to the various powered elements of the vehicle-based utility locating device 100. In some embodiments, such electrical power may be provided to the vehicle-based utility locating device 100 from the vehicle 110.

Figure 3A:
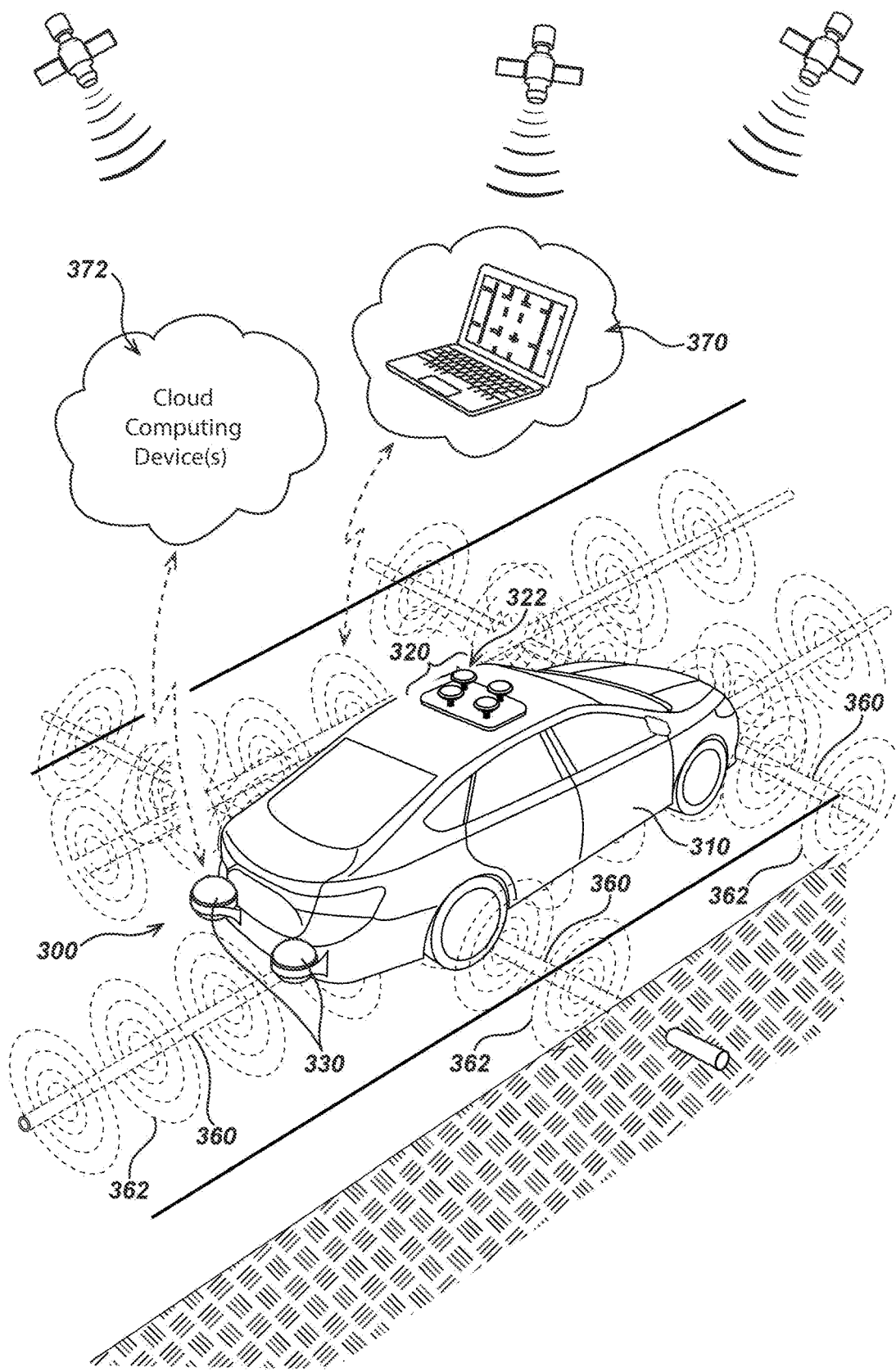
FIG. 3A is an illustration of another vehicle-based utility locating device embodiment used to locate and map utility lines buried in the ground.
Figure 3B:
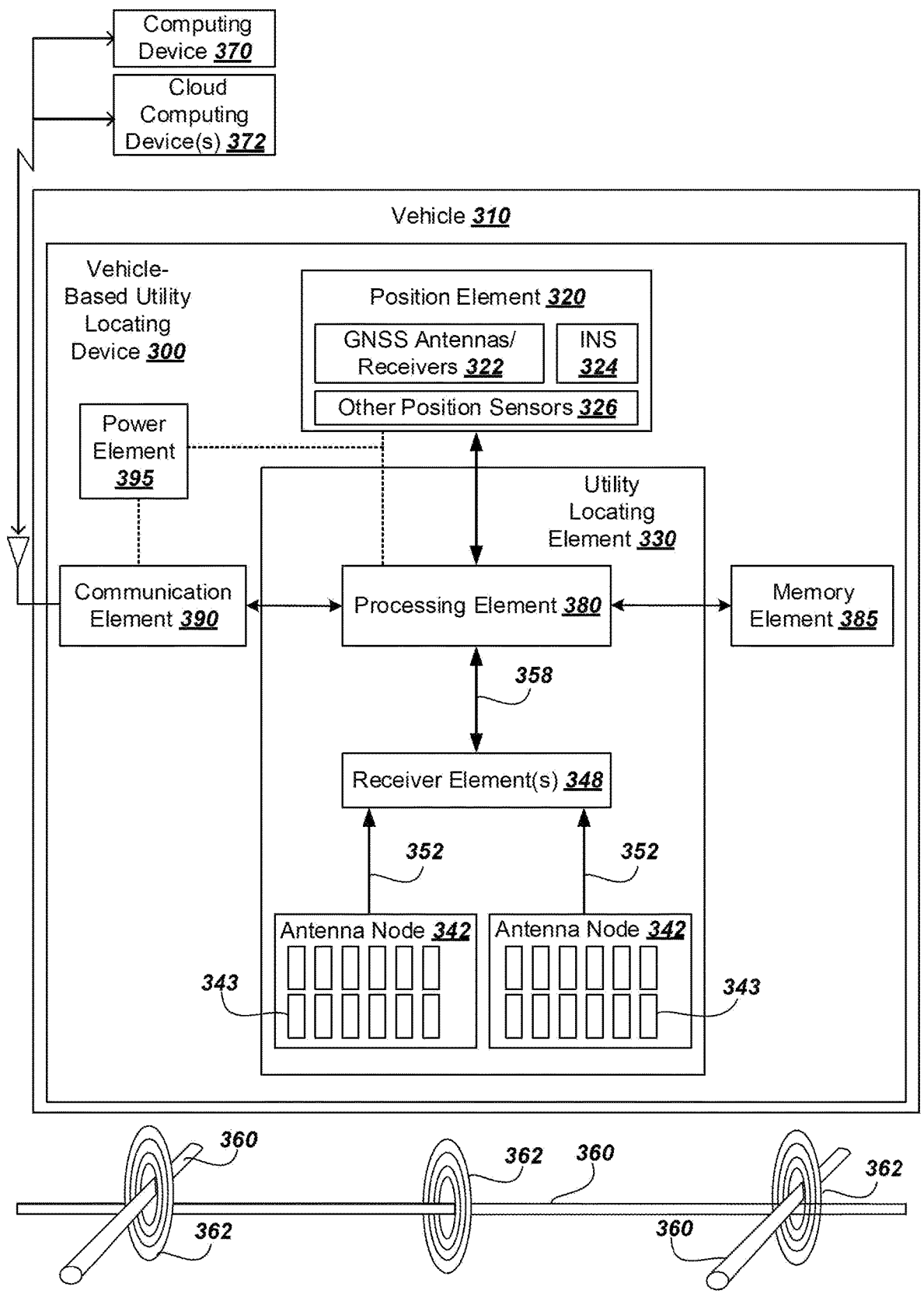
FIG. 3B is a diagram of the vehicle-based utility locating device embodiment of FIG. 3A.

Turning to FIGS. 3A and 3B, a vehicle-based utility locating device 300 in keeping with the present disclosure is illustrated that may be built into a vehicle 310. The vehicle-based utility locating device 300 may include a position element 320 including one or more GNSS antennas and associated receivers, such as the GNSS antennas/receivers 322, to determine position data of the vehicle-based utility locating device in the world frame. Likewise, the position element may include one or more other sensors or systems to determine position. For instance, as illustrated in FIG. 3B, the position element 320 may further include one or more inertial navigation system (INS) sensors 324 that includes gyroscopic sensors, accelerometers, magnetometers, or the like and/or other position sensors 326 for determining movement or position in the world frame (e.g., light detection and radar (LiDAR) systems, other rangefinders, optical or mechanical ground tracking devices, or the like and/or system, sensors, and methods associated with SLAM or the like). Different position sensors and systems may be included in other vehicle-based utility locating device embodiments in keeping with the present disclosure.

The vehicle-based utility locating device 300 may further include a utility locating element 330 for sensing electromagnetic signals that may be emitted by one or more utility lines 360 that may be buried in the ground and use the sensed electromagnetic signals 362 to determine the presence and location or absence of buried utility lines 360. In the vehicle-based utility locating device 300, the utility locating element 330 may be or include one or more antenna nodes 342 configured to sense electromagnetic signals 362 as the vehicle-based utility locating device 300 is moved through an area of interest. Each antenna node 342 may house a dodecahedral array of antennas 343 (FIG. 3B), which may be or share aspects with the dodecahedral array of antennas 143 illustrated in FIG. 2B, or other arrangement/quantity of antennas.

Further illustrated in FIG. 3B, the antennas 343 of antenna node 342 may provide antenna array output signals 352 corresponding to the sensed magnetic fields 362 from utility line 360. A receiver element 348 comprising one or more receivers may receive the antenna array output signals 352. The receiver element 348 may include one or more filters and signal conditioners to receive the antenna array output signals 352 and generate receiver output signals 358. The receiver output signals 358 may be sampled at a processing element 380 at 2 Hz or faster. The processing element 380, comprising one or more processors, may receive the receiver output signals 358 and determine principal components for a plurality of frequency bands which may be organized into one or more frequency bands such as the frequency band scheme 400 of FIG. 4 or the frequency band scheme 500 of FIG. 5 or other frequency band schemes. Such processing may instead be or be shared by a processing element disposed in a connected computing device 370 in real-time, near real-time, or in post processing. The processing element 380, or other connected processing element may generate output data signals representing one or more field vectors corresponding to the eigenvector and eigenvalues of the principal components which may be further correlated with position data from the position element 320. For instance, processing element 380 and/or other connected processing element may carry out the method 600 of FIG. 6, method 700 of FIG. 7A, method 710 of FIG. 7B, method 750 of FIG. 7C, method 760 of FIG. 7D, method 800 of FIG. 8, and/or method 900 of FIG. 9 to determine and map utility lines using principal component analysis (PCA) that may be used with the vehicle-based utility locating devices of the present disclosure.

The vehicle-based utility locating device 300 may include a memory element 385 comprising one or more non-transitory memories for storing output data values, signal data, position and mapping data, and instructions relating to PCA or other methods for determining principal components and mapping utility locations methods. The vehicle-based utility locating device 300 may further a communication element 390 comprising one or more radio transceivers to communicate data including output data values, signal data, position data, and other data relating to determining and mapping utility locations methods to a computing device such as computing device 370. Likewise, such data may be communicated to one or more cloud computing devices 372 for storage, processing, mapping of utility and related data, and/or the like. Further, a power element 395 may provide electrical power to the various powered elements of the vehicle-based utility locating device 300. In some embodiments, such electrical power may be provided to the vehicle-based utility locating device 300 from the vehicle 310.

Figure 4:
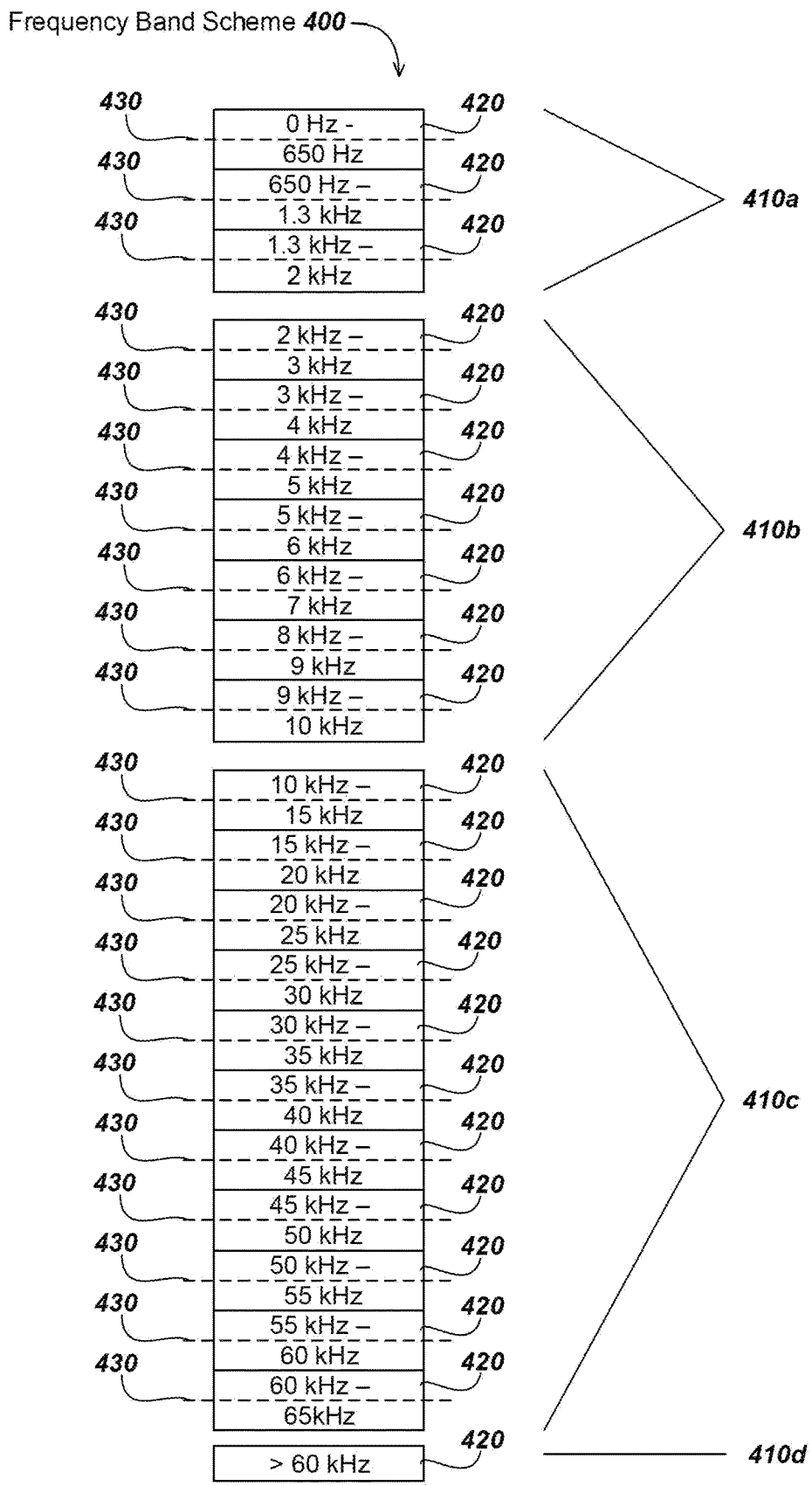
FIG. 4 is a diagram of an exemplary frequency band scheme embodiment.

Turning to FIG. 4, an exemplary frequency band scheme 400 is illustrated having a number of frequency band series 410a, 410b, 410c, and 410d. Each frequency band series 410a, 410b, 410c, and 410d may have a plurality of individual frequency bands 420. Each frequency band 420 may be approximately evenly spaced apart in the respective frequency band series 410a, 410b, or 410c. For instance, each frequency band 420 may have a bandwidth of 5 kHz or less and may be calibrated about a midpoint 430 of each frequency band 420. In frequency band scheme 400, for instance, the individual frequency bands 420 of frequency band series 410a may each be 650 Hz/700 Hz wide ranging from 0-2 kHz. The individual frequency bands 420 of frequency band series 410b may each be 1 kHz wide ranging from 2-10 kHz. Further, the individual frequency bands 420 of frequency band series 410c may each be 5 kHz wide ranging from 10-65 kHz. The frequency band series 410d may include frequencies greater than 65 kHz.

Figure 5:
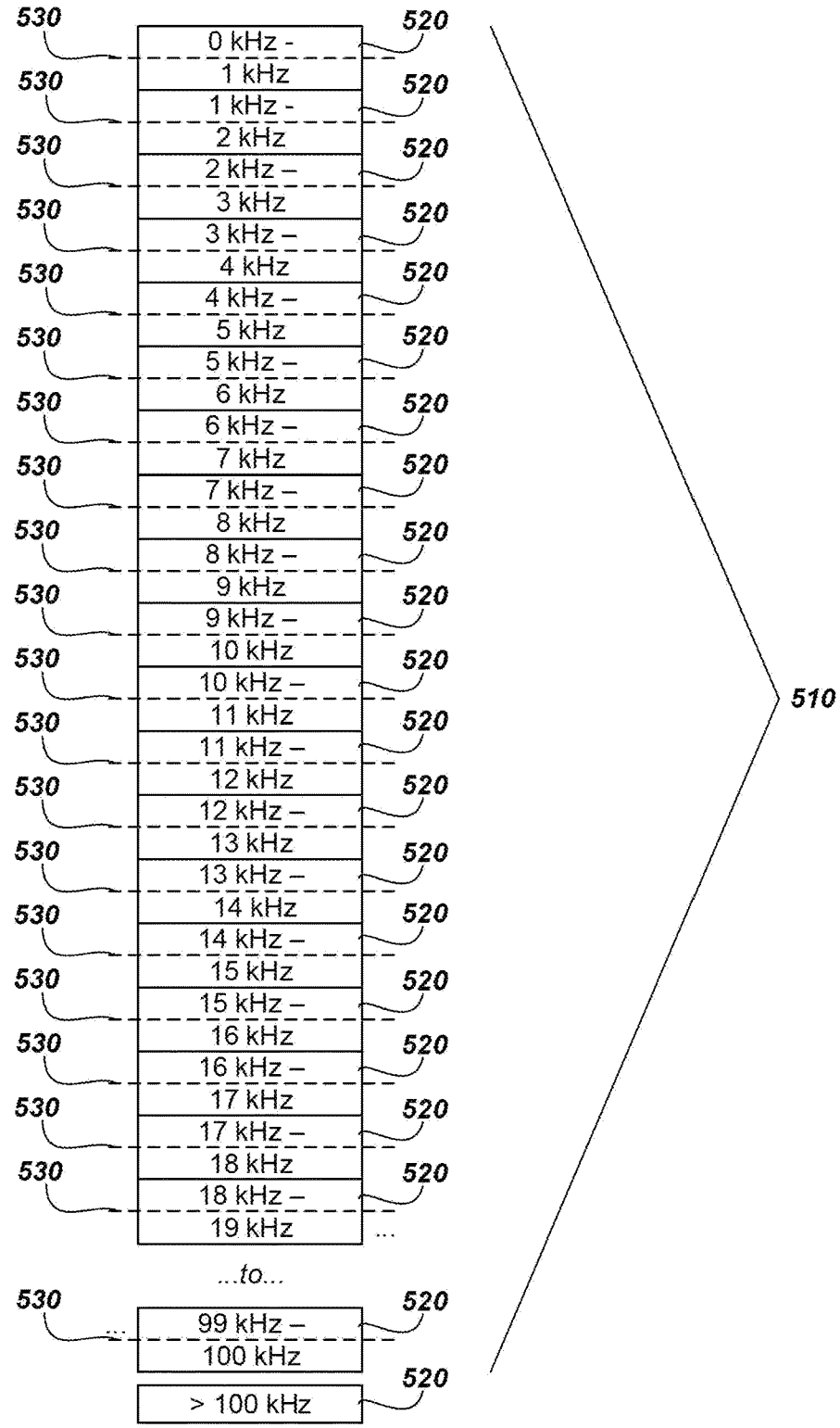
FIG. 5 is a diagram of another exemplary frequency band scheme embodiment.

Turning to FIG. 5, another exemplary frequency band scheme 500 is illustrated having a single frequency band series 510. The frequency band series 510 may have a plurality of individual frequency bands 520. Each frequency band 520 may be approximately evenly spaced apart in the frequency band series 510. For instance, each frequency band 520 may have a bandwidth of 1 kHz or less and may be calibrated about a midpoint 530 of each frequency band 520. In frequency band scheme 500, the individual frequency bands 520 may each be 1 kHz wide ranging from 0-100 kHz and may further include frequency bands 520 having frequencies greater than 100 kHz.

It should be noted that other frequency band schemes may be used with the vehicle-based utility locating devices in keeping with the present disclosure besides those described in frequency band scheme 400 of FIG. 4 and frequency band scheme 500 of FIG. 5. For instance, some frequency schemes may include variable spacing in one or more series of frequency bands.

Figure 6:
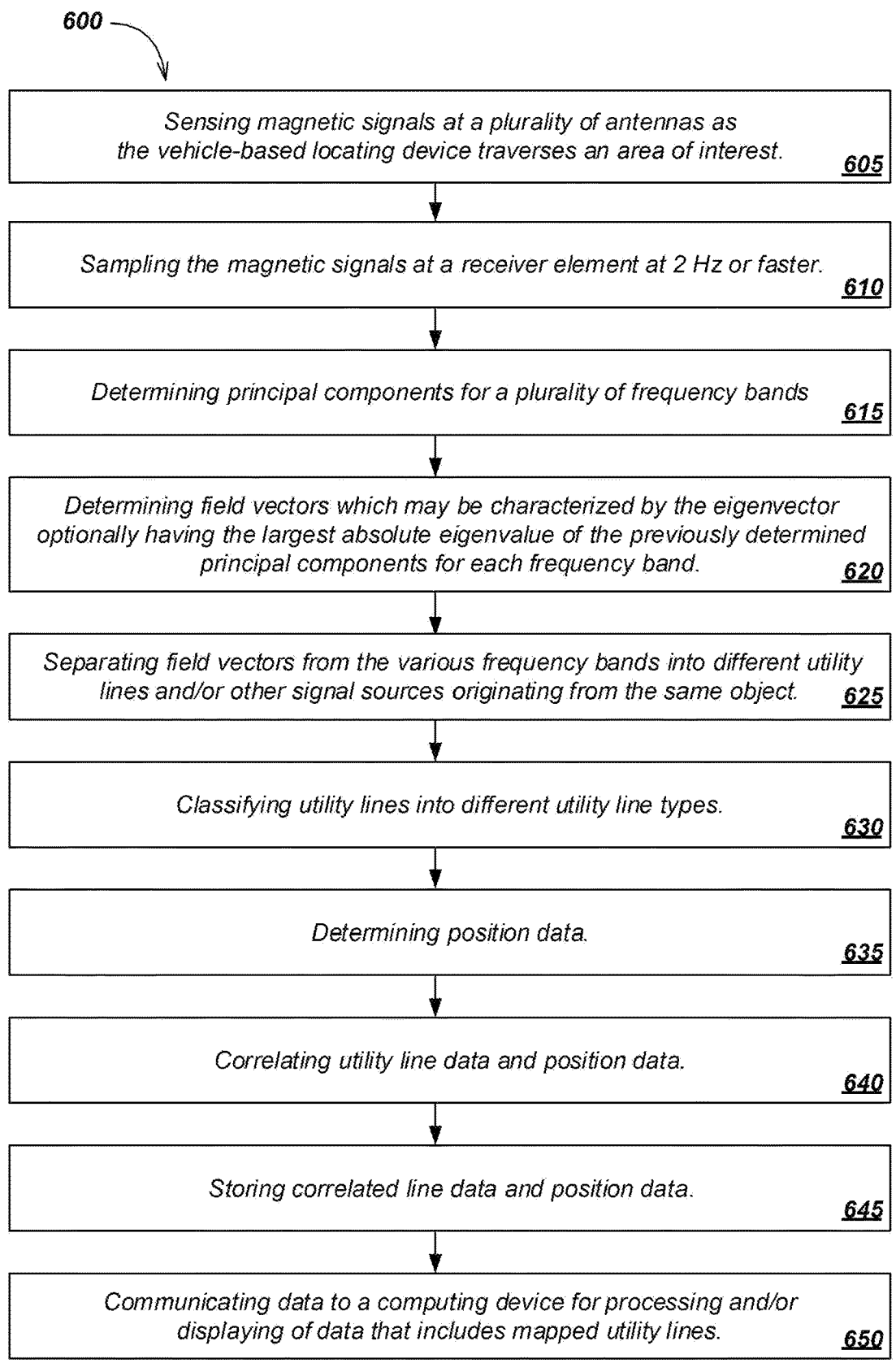
FIG. 6 is a principal component based method embodiment for determining the position of and mapping utility lines that may be used with a vehicle-based utility locating device.

Turning to FIG. 6, a principal component based method 600 for determining the position of and mapping utility lines that may be used with a vehicle-based utility locating device of the present disclosure is described. In a first step 605, magnetic signals may be sensed at a plurality of antennas as the vehicle-based locating device traverses an area of interest. In a step 610, the magnetic signals may be sampled by a receiver element at 2 Hz or faster. In a step 615, principal components may be determined for a plurality of frequency bands. Such frequency bands may, in some embodiments, be evenly spaced apart in one or more sets of frequency bands. In other embodiments, other types of frequency band schemes may be used. For instance, variable spacing in one or more series of frequency bands may be used in some embodiments. The principal components of step 615 may, for instance, be found through the method 700 of FIG. 7A, method 710 of FIG. 7B, method 750 of FIG. 7C, or method 760 of FIG. 7D. In a step 620, field vectors which may be characterized by the eigenvector optionally having the largest absolute eigenvalue of the previous step may be determined from the principal components for each frequency band. In a step 625, field vectors from the various frequency bands may be separated into different utility lines and/or other signal sources originating from the same object. The step 625 may, for instance, utilize the principal component based method 800 for separating magnetic signals into different utility lines or other signal sources originating from the same object described in FIG. 8. In a step 630, utility lines may be classified into different utility line types. In a step 635, position data may be determined. The step 635 may, for instance, use the principal component based method 900 for classifying utility lines described with FIG. 9. In a step 640, utility line data may be correlated with position data. In a step 645, utility line data and position data may be stored in one or more non-transitory memories. In a step 650, data may be communicated to a computing device for processing and/or displaying of data that includes mapped utility lines.

Figure 7A:
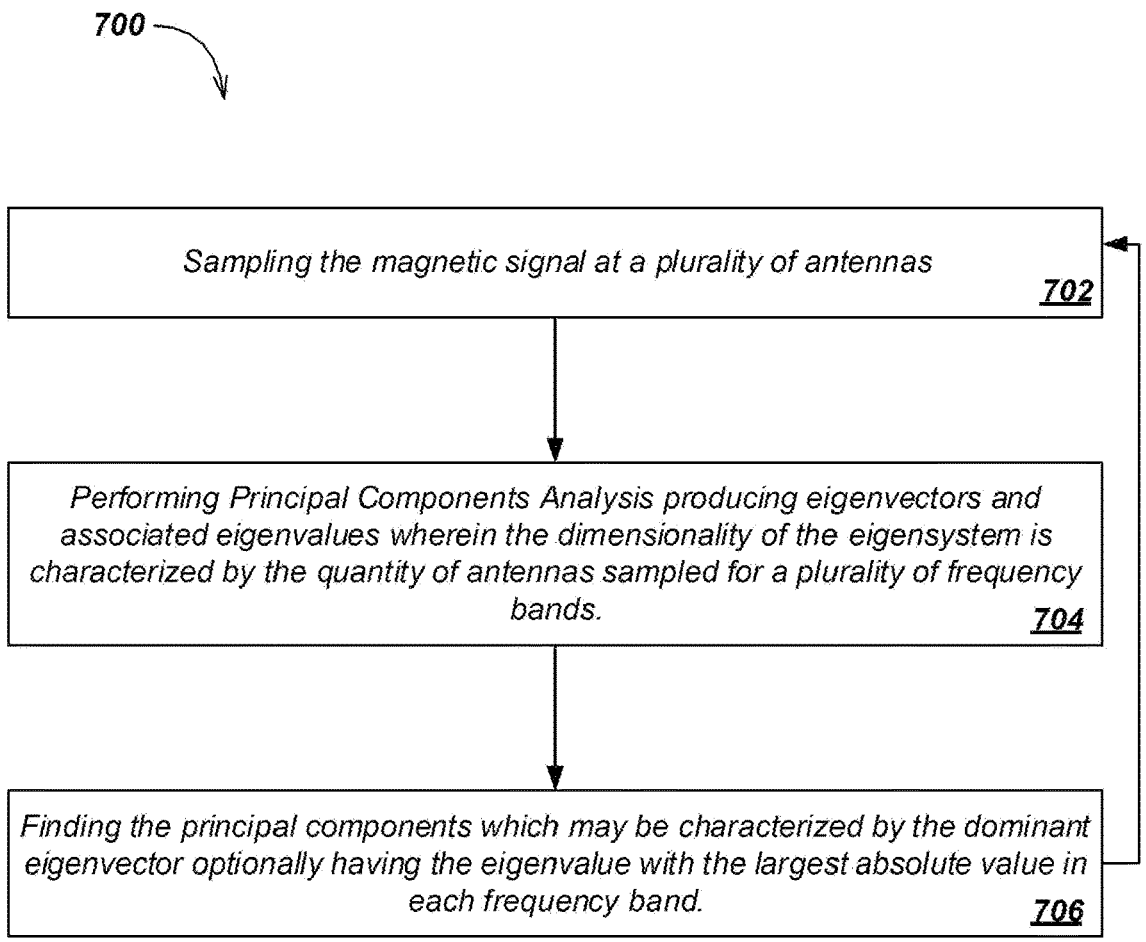
FIG. 7A is a method embodiment for determining principal components for use in utility locating.

Turning to FIG. 7A, a method 700 for determining principal components for use in locating and mapping utility lines is described. In a first step 702, the method 700 may include sampling the magnetic signal at a plurality of antennas. For instance, in the dodecahedral array of antennas 143 of the antenna node 142 illustrated in FIG. 2B, magnetic signal may be sampled at all twelve antennas 143. In another step 704, the method 700 may further include performing Principal Components Analysis producing eigenvectors and associated eigenvalues wherein the dimensionality of the eigensystem is characterized by the quantity of antennas sampled for a plurality of frequency bands. Such frequency bands may, in some embodiments, be evenly spaced apart in one or more sets of frequency bands. In other embodiments, other types of frequency band schemes may be used. For instance, variable spacing in one or more series of frequency bands may be used in some embodiments. In a step 706, the principal components which may be characterized by the dominant eigenvector optionally having the eigenvalue with the largest absolute value may be found for each frequency band. The method 700 may repeat throughout the area of interest.

Figure 7B:
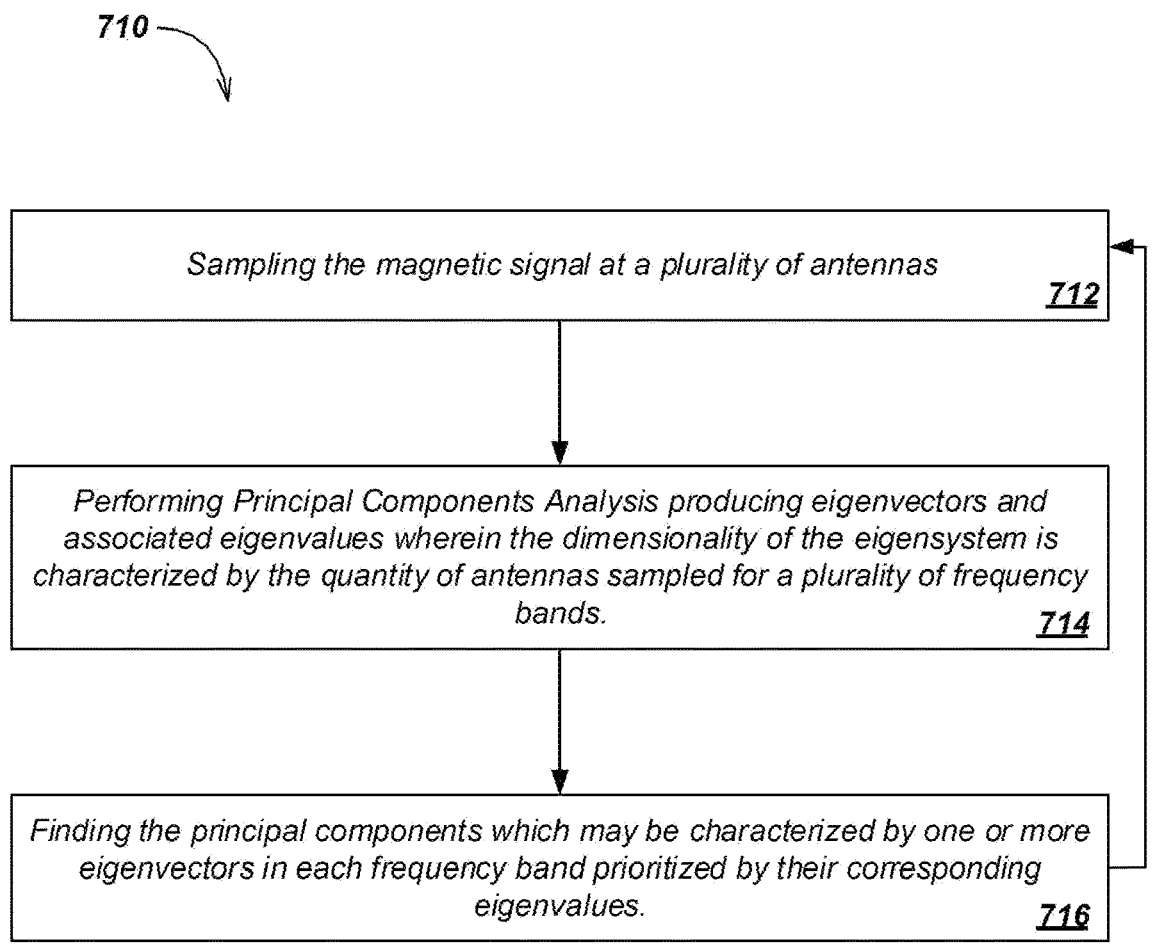
FIG. 7B is another method embodiment for determining principal components for use in utility locating.

Turning to FIG. 7B, a method 710 for determining principal components for use in locating and mapping utility lines is described. In a first step 712, the method 710 may include sampling the magnetic signal at a plurality of antennas. For instance, in the dodecahedral array of antennas 143 of the antenna node 142 illustrated in FIG. 2B, magnetic signal may be sampled at all twelve antennas 143. In another step 714, the method 710 may further include performing Principal Components Analysis producing eigenvectors and associated eigenvalues wherein the dimensionality of the eigensystem is characterized by the quantity of antennas sampled for a plurality of frequency bands. Such frequency bands may, in some embodiments, be evenly spaced apart in one or more sets of frequency bands. In other embodiments, other types of frequency band schemes may be used. For instance, variable spacing in one or more series of frequency bands may be used in some embodiments. In a step 716, the principal components which may be characterized by one or more eigenvectors in each frequency band where the eigenvectors are prioritized by their corresponding eigenvalues. The method 710 may repeat throughout the area of interest.

Figure 7C:
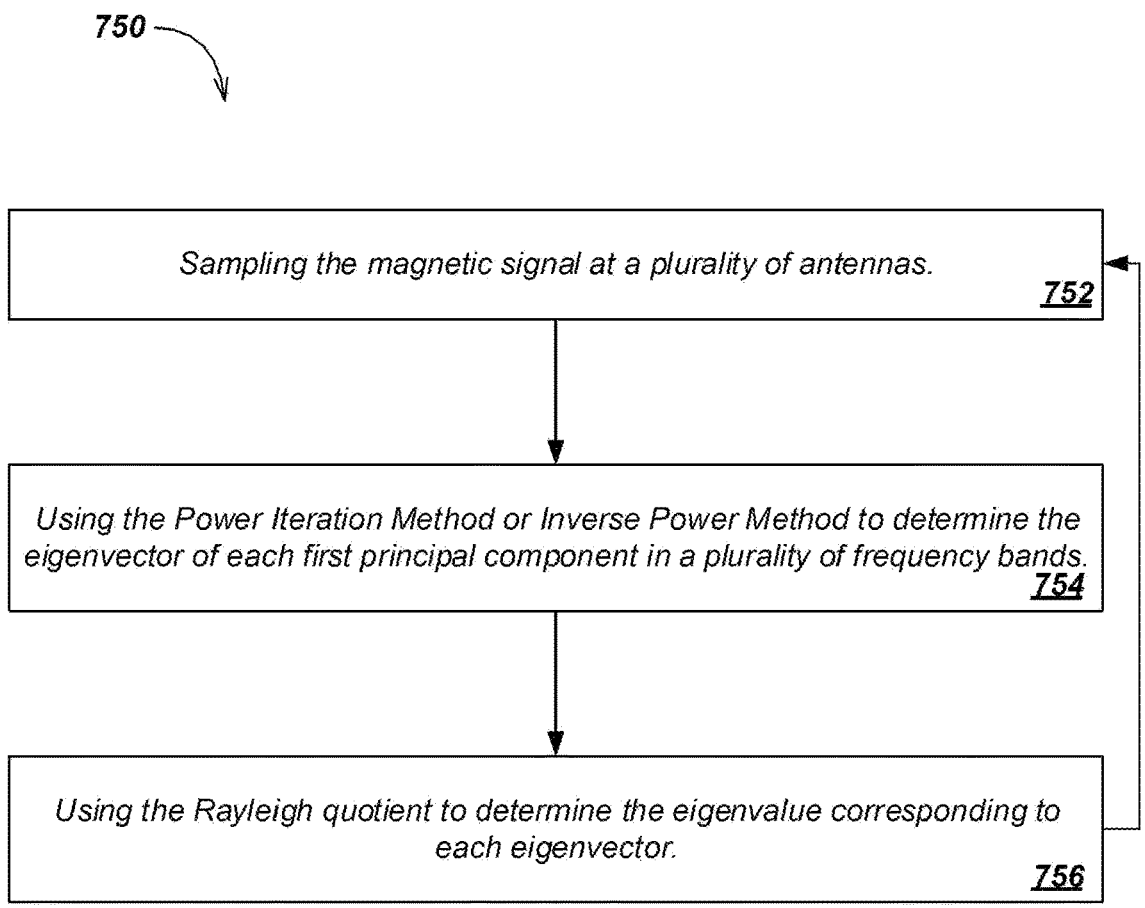
FIG. 7C is a computationally-efficient method embodiment for determining principal components for use in utility locating.

Turning to FIG. 7C, a computationally-efficient method 750 for determining principal components for use in utility locating is described. In a step 752 the method 750 may include sampling the magnetic signal at a plurality of antennas. For instance, in the dodecahedral array of antennas 143 of the antenna node 142 illustrated in FIG. 2B, magnetic signal may be sampled at all twelve antennas 143. In another step 754, the Power Iteration Method or Inverse Power Method may be used to determine the eigenvector of each first principal component in a plurality of frequency bands. Such frequency bands may, in some embodiments, be evenly spaced apart in one or more sets of frequency bands. In other embodiments, other types of frequency band schemes may be used. For instance, variable spacing in one or more series of frequency bands may be used. In a step 756, the Rayleigh quotient may be used to determine the eigenvalue corresponding to each eigenvector of step 754. The method 750 may repeat throughout the area of interest.

Figure 7D:
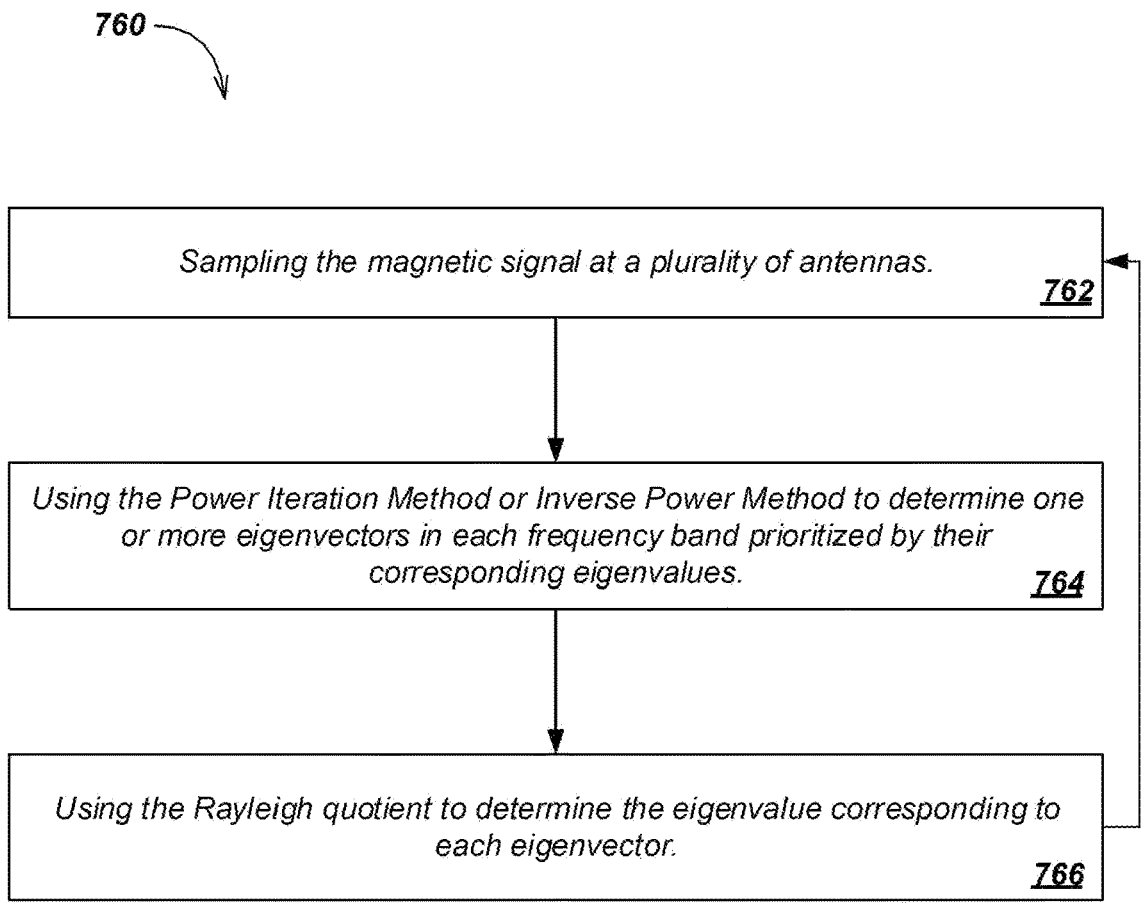
FIG. 7D is another computationally-efficient method embodiment for determining principal components for use in utility locating.

Turning to FIG. 7D, another computationally-efficient method 760 for determining principal components for use in utility locating is described. In a step 762 the method 760 may include sampling the magnetic signal at a plurality of antennas. For instance, in the dodecahedral array of antennas 143 of the antenna node 142 illustrated in FIG. 2B, magnetic signal may be sampled at all twelve antennas 143. In another step 764, the Power Iteration Method or Inverse Power Method may be used to determine one or more eigenvectors in each frequency band that may be prioritized by their corresponding eigenvalues. Such frequency bands may, in some embodiments, be evenly spaced apart in one or more sets of frequency bands. In other embodiments, other frequency band schemes may be used such as variable spacing in one or more series of frequency bands. In a step 766, the Rayleigh quotient may be used to determine the eigenvalue corresponding to each eigenvector of step 764. The method 760 may repeat throughout the area of interest.

Figure 8:
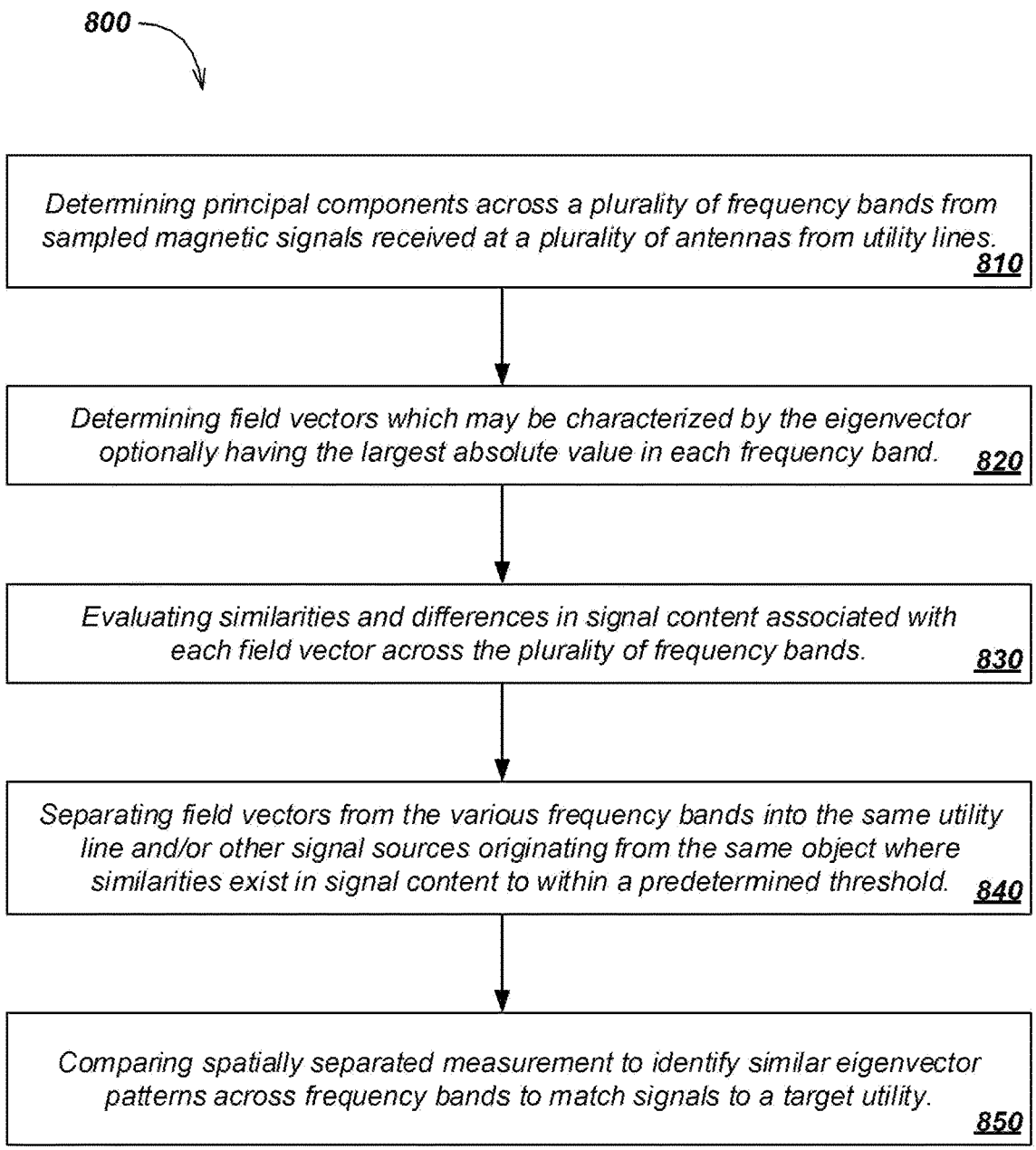
FIG. 8 is a principal component based method embodiment for separating magnetic signals into different utility lines or other signal sources originating from the same object.

Turning to FIG. 8, a principal component based method 800 for separating magnetic signals into different utility lines or other signal sources originating from the same object is described. In a step 810, principal components may be determined across a plurality of frequency bands from sampled magnetic signals received at a plurality of antennas from utility lines. The frequency bands may, in some embodiments, be organized into one or more series of evenly spaced apart frequency bands. In other embodiments, other frequency band schemes may be used such as variable spacing in one or more series of frequency bands. In a step 820, field vectors may be determined which may be characterized by the eigenvector optionally having the largest absolute value in each frequency band. In a step 830, similarities and differences in signal content associated with each field vector at each of the plurality of frequency bands may be evaluated. The signal content may include the measureable qualities associated with each signal in each frequency band. For instance, such signal content may include, but should not be limited to, measures of signal power, frequency, position including orientation/pose and depth of the measured signal, and/or the like. In a step 840, field vectors from the various frequency bands may be classified into the same utility line and/or other signal source where similarities exist in signal content to within a predetermined threshold. The method 800 may include a step 850 comparing spatially separated measurements to identify similar eigenvector patterns across frequency bands to match signals to a target utility.

Figure 9:
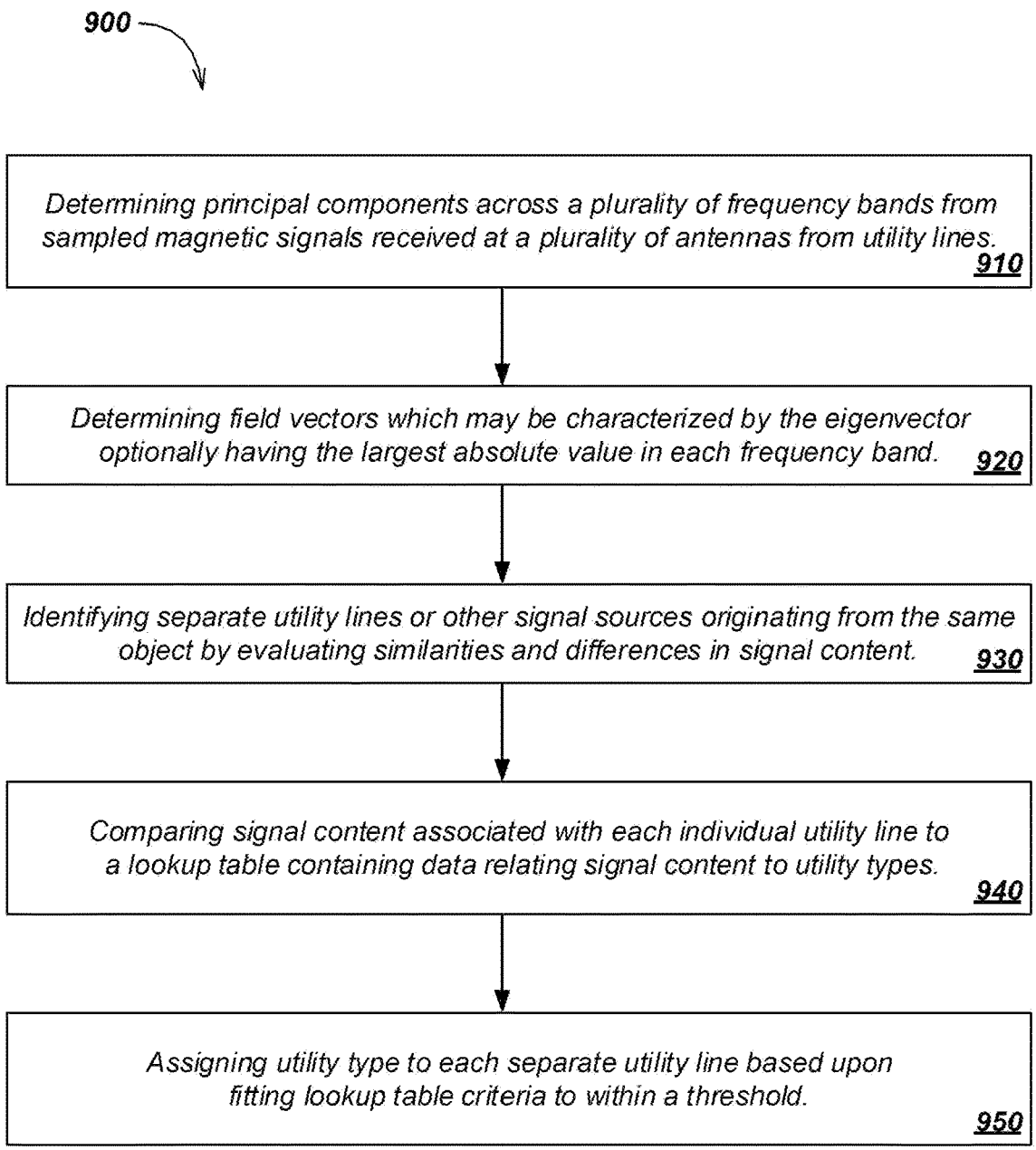
FIG. 9 is a principal component based method embodiment for classifying utility lines via vehicle-based utility locating device.

Turning to FIG. 9, a principal component based method 900 for classifying utility lines via vehicle-based utility locating device is described. In a step 910, principal components may be determined across a plurality of frequency bands from sampled magnetic signals received at a plurality of antennas from utility lines. The frequency bands may be, in some embodiments, organized into one or more series of evenly spaced apart frequency bands. In other embodiments, other frequency band schemes may be used such as variable spacing in one or more series of frequency bands. In a step 920, field vectors may be determined which may be characterized by the eigenvector optionally having the largest absolute value in each frequency band. In a step 930, separate utility lines or other signal sources originating from the same object may be determined by evaluating similarities and differences in signal content. For instance, step 930 may use method 800 of FIG. 8. In a step 940, signal content associated with each individual utility line may be compared to a lookup table containing data relating signal content to utility types. The signal content may include the measureable qualities associated with each signal in each frequency band. For instance, such signal content may include, but should not be limited to, measures of signal power, frequency, position including orientation/pose and depth of the associated utility line, and/or the like. In a step 950, utility type may be assigned to each separate utility line or signal sources originating from the same object based upon fitting lookup table criteria to within a threshold.

In one or more exemplary embodiments, the functions, methods, and processes described may be implemented in whole or in part in hardware, software, firmware, or any combination thereof. If implemented in software, the functions may be stored on or encoded as one or more instructions or code on a computer-readable medium. Computer-readable media include computer storage media. Storage media may be any available media that can be accessed by a computer.

The various illustrative functions, modules, and circuits described in connection with the embodiments disclosed herein with respect to locating and/or mapping, and/or other functions described herein may be implemented or performed in one or more processing units or modules with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The disclosures are not intended to be limited to the aspects shown herein, but are to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure and invention. Thus, the presently claimed invention is not intended to be limited to the aspects shown herein, but is to be accorded the widest scope consistent with the following claims and their equivalents.

We claim:

1. A vehicle-based utility locating device for use with a vehicle, comprising:
   a positioning element including one or more GNSS antennas and associated receivers to receive positioning signals and determine position data of the vehicle-based utility locating device in a world frame;
   a utility locating element for determining the presence and location or absence of buried utility lines, including:
      an antenna array to receive AC magnetic fields emitted from one or more buried utilities as the utility locating element is moved through an area of interest and provide antenna array output signals corresponding to the sensed AC magnetic fields;
      a receiver element having a receiver input operatively coupled to the antenna array output to sample the antenna array output signals and provide, at a receiver output, receiver output signals corresponding to the sensed AC magnetic fields; and
      a processing element, including one or more processors, operatively coupled to the receiver element receiver output to:
      receive the receiver output signals and determine principal component values in a plurality of frequency bands; and
      output data signals representing one or more field vectors corresponding to the eigenvector and eigenvalues of the principal component values so as to be correlated with the position data;
   a memory element comprising one or more non-transitory memories for storing output data values, signal data, position and mapping data, and instructions to implement a signal processing method for determining and mapping utility locations on a communicatively coupled processing element;
   a communication element comprising one or more radio transceivers to communicate data including at least output data values, signal data, and position data relating to determining and mapping utility locations to a communicatively coupled computing device; and
   a power element to provide electrical power to one or more of the positioning element, the utility locating element, the memory element, and the communication of the vehicle-based utility locating device.

2. The device of claim 1, wherein ones of frequencies in the plurality of frequency bands are spaced apart in one or more series of frequency bands.

3. The device of claim 1, wherein antenna array output signals are sampled at speeds of 2 Hz or faster.

4. The device of claim 1, wherein each frequency band has a bandwidth of 2 kHz or less.

5. The device of claim 1, wherein each frequency band is calibrated at the mid-point of the band.

6. The device of claim 1, wherein the contents of the frequency bands are used to provide data defining two or more different utility lines.

7. The device of claim 1, wherein the contents of the frequency bands are used to provide data classifying two or more different utility lines.

8. The device of claim 1, wherein the utility locating element is or includes one or more human portable utility locator devices mechanically coupled to the vehicle.

9. The device of claim 1, wherein one or more of the elements of the vehicle-based utility locating device are removably coupled to the vehicle.

10. A principal component based method for determining the position of and mapping utility lines with a vehicle-based utility locating device disposed on a vehicle, comprising:
    sensing AC magnetic field signals at a plurality of antennas of the vehicle-based locating device as the vehicle traverses an area of interest and providing antenna output signals corresponding to the sensed AC magnetic field signals;
    receiving and sampling the antenna output signals at a receiver element at a rate of 2 Hz or faster;
    determining principal component values for a plurality of spaced apart frequency bands based on the sample antenna output signals;
    determining field vectors characterized by the eigenvector having the largest absolute eigenvalue of the previously determined principal component values for each frequency band;
    separating field vectors from the various frequency bands into different utility lines originating from the same object;
    classifying utility lines into different utility line types based on the separate field vectors;
    determining position data;
    correlating utility line data and position data;
    storing correlated line data and position data; and
    communicating the correlated line and position data to a computing device for processing and/or displaying of data that includes mapped utility lines.

11. The method of claim 10, wherein the frequency bands are arranged into one or more series of evenly spaced apart frequency bands.

12. A principal component based method for separating magnetic signals into different utility lines, comprising:
    determining principal components across a plurality of frequency bands from sampled magnetic signals received at a plurality of antennas from utility lines;
    determining field vectors which may be characterized by the eigenvector optionally having the largest absolute value in each frequency band;
    evaluating similarities and differences in signal content associated with each field vector at each of the plurality of frequency bands;
    separating field vectors from the various frequency bands into the same utility line where similarities exist in signal content to within a predetermined threshold; and
    comparing spatially separated measurement to identify similar eigenvector patterns across frequency bands to match signals to a target utility.

13. The method of claim 12, wherein the frequency bands are organized into one or more series of evenly spaced apart frequency bands.

14. The method of claim 12, wherein the signal content includes a measure of signal power of the utility line/signal source.

15. The method of claim 12, wherein the signal content includes a measure of signal frequency of the utility line/signal source.

16. The method of claim 12, wherein the signal content includes a measure of position of the utility line/signal source.

17. The method of claim 12, wherein the signal content includes a measure of orientation/pose of the utility line/signal source.

18. A principal component based method for classifying utility lines via a vehicle-based utility locating device, comprising:
    determining principal components across one or more series of frequency bands from sampled AC magnetic signals emitted from one or more utilities and received at a plurality of antennas;
    determining field vectors characterized by the eigenvector having the largest absolute value in each frequency band;
    identifying separate utility lines by evaluating similarities and differences in signal content based on the field vectors;
    comparing signal content associated with each individual utility line to a predefined lookup table containing data associating signal content to utility types; and
    assigning a utility type to each separate utility line based upon fitting lookup table criteria to within a predefined threshold.

19. The method of claim 18, wherein the frequency bands are organized into one or more series of evenly spaced apart frequency bands.

20. The method of claim 18, wherein the signal content includes a measure of signal power of the utility line/signal source.

* * * * *